(12) United States Patent
Oota

(10) Patent No.: US 10,371,513 B2
(45) Date of Patent: Aug. 6, 2019

(54) CALCULATION METHOD, STORAGE MEDIUM, INFORMATION PROCESSING APPARATUS, AND MEASUREMENT APPARATUS

(71) Applicant: CANON KABUSHIKI KAISHA, Tokyo (JP)

(72) Inventor: Tetsuji Oota, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 403 days.

(21) Appl. No.: 14/853,179

(22) Filed: Sep. 14, 2015

(65) Prior Publication Data

US 2016/0084630 A1 Mar. 24, 2016

(30) Foreign Application Priority Data

Sep. 19, 2014 (JP) ................................. 2014-191876

(51) Int. Cl.
*G01B 5/20* (2006.01)
*G01B 21/04* (2006.01)

(52) U.S. Cl.
CPC ................... *G01B 21/045* (2013.01)

(58) Field of Classification Search
None
See application file for complete search history.

(56) References Cited

U.S. PATENT DOCUMENTS 8,578,619 B2  11/2013 Nakajima
2013/0202215 A1* 8/2013 Yonetani ............. G01B 11/255
382/203

FOREIGN PATENT DOCUMENTS

JP        3272952 B2     4/2002
JP     2002357415 A    12/2002
JP     2005156235 A     6/2005
JP     2012168001 A     9/2012

OTHER PUBLICATIONS

Office Action issued in Japanese Application No. 2014-191876 dated Jul. 9, 2018.

* cited by examiner

*Primary Examiner* — Robert K Carpenter
(74) *Attorney, Agent, or Firm* — Rossi, Kimms & McDowell LLP

(57) ABSTRACT

The present invention provides a calculation method of calculating a shape of a measurement target surface, including a step of obtaining first corrected shape data by correcting first shape measurement data by using a first correction parameter for correcting a measurement error caused by scanning a probe in a first direction, obtaining second corrected shape data by correcting second shape measurement data by using a second correction parameter for correcting a measurement error caused by scanning the probe in a second direction, and generating first whole shape data representing a shape of the whole measurement target surface by synthesizing the first corrected shape data and the second corrected shape data.

11 Claims, 16 Drawing Sheets

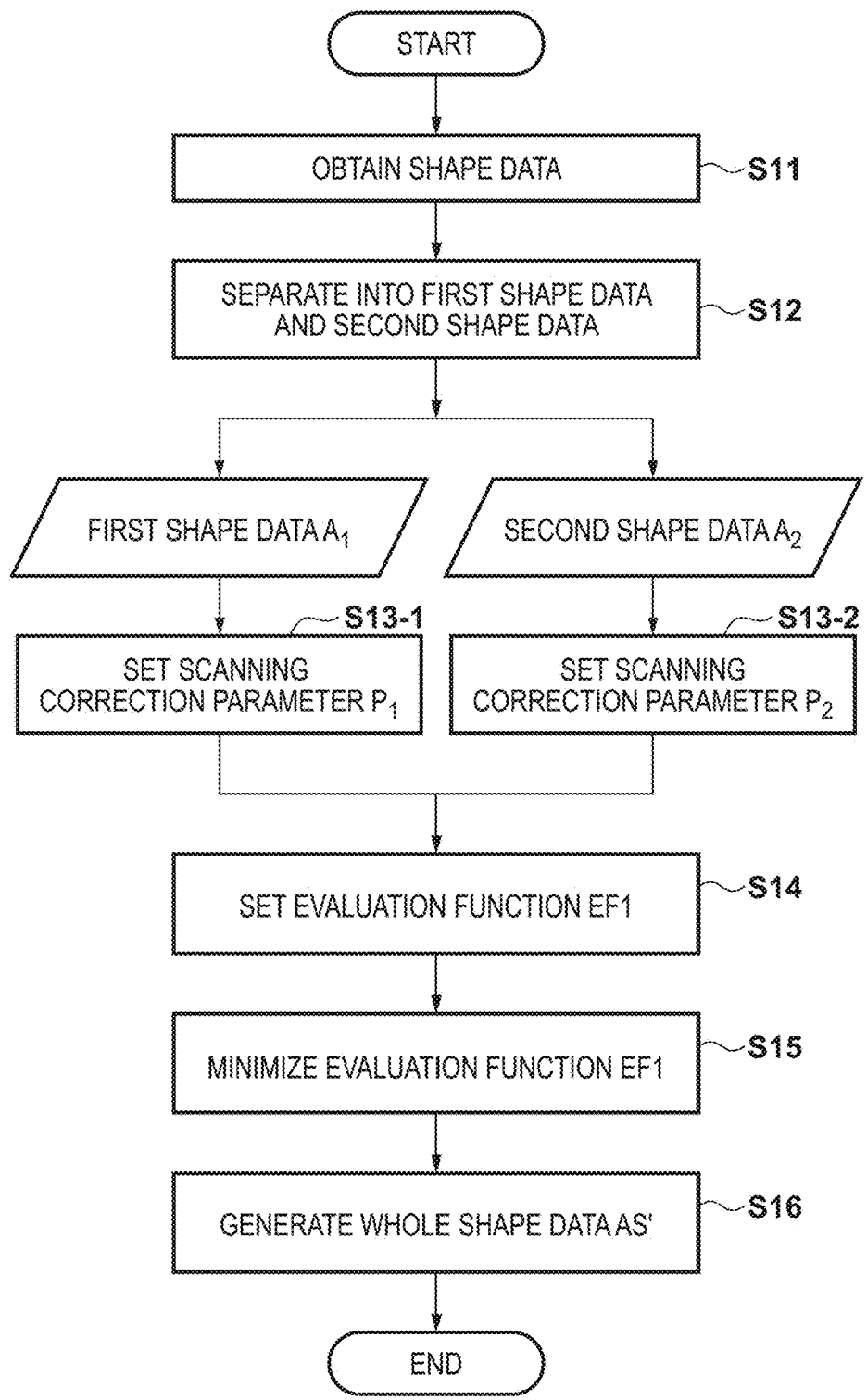

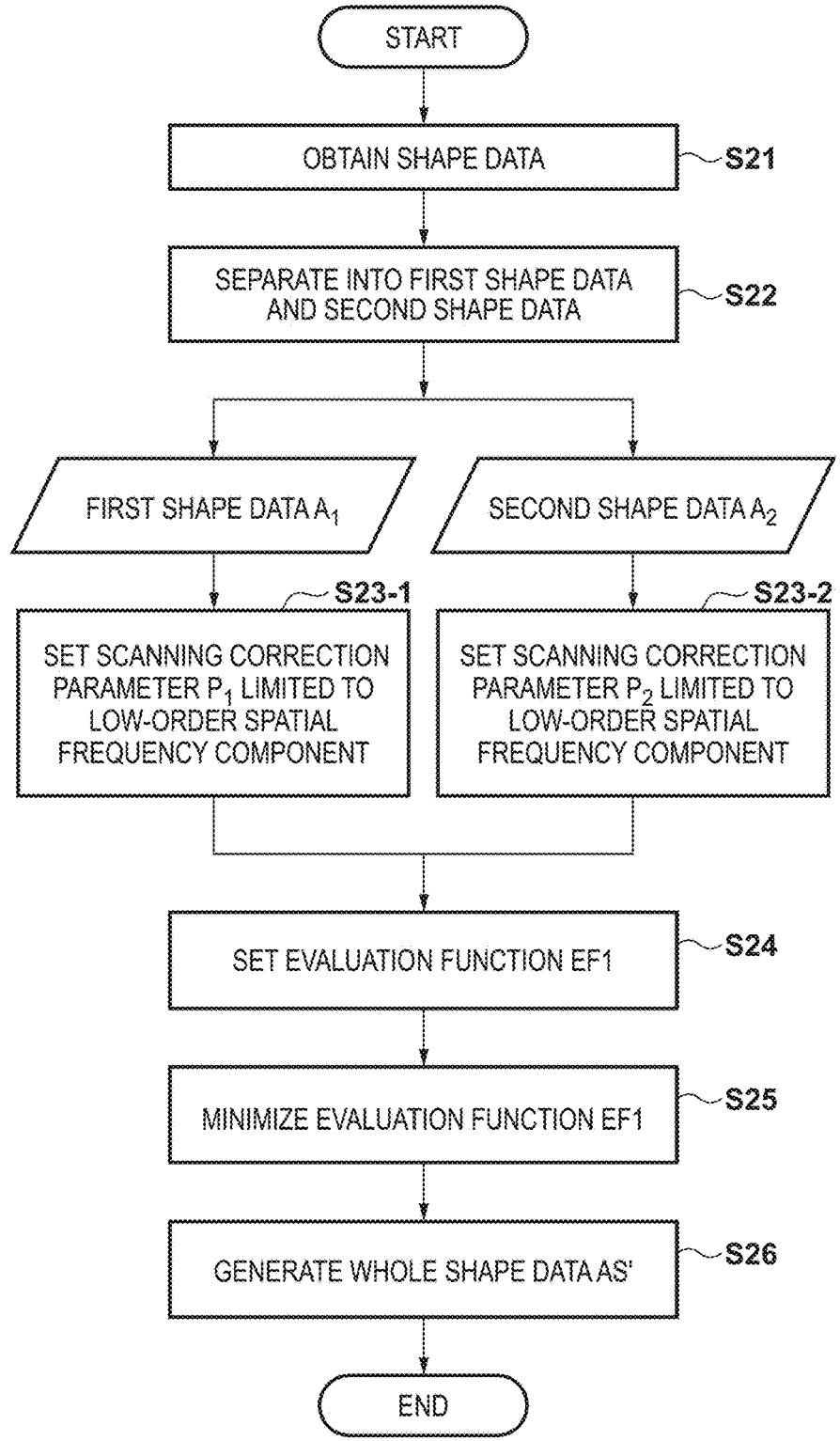

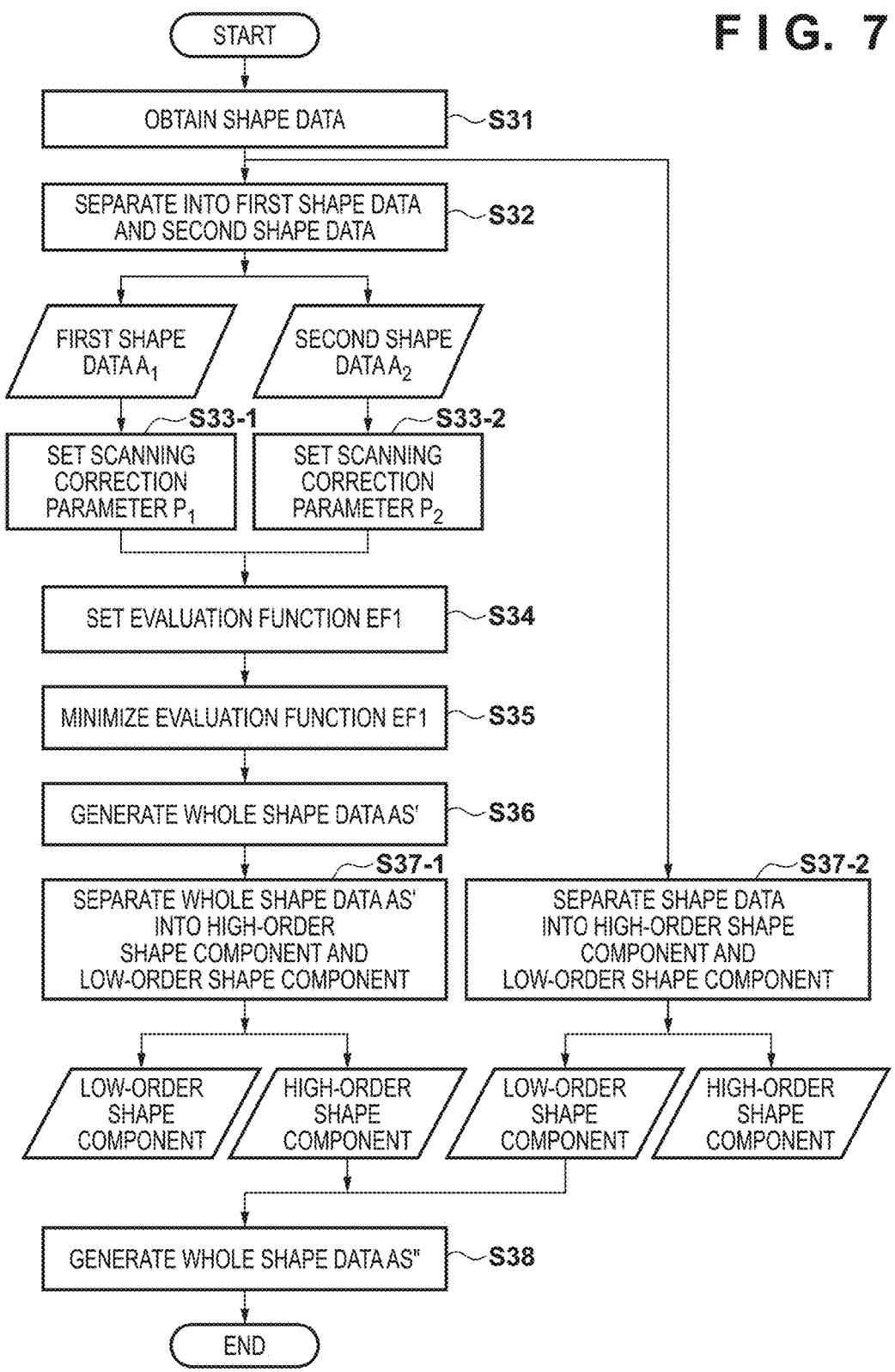

F I G. 12A
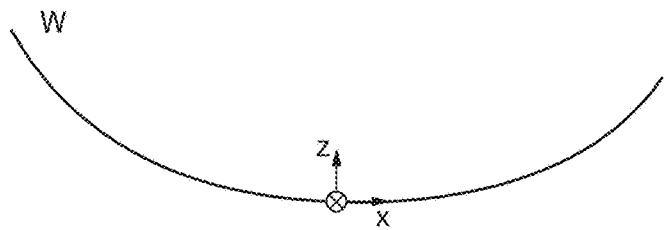
F I G. 12B
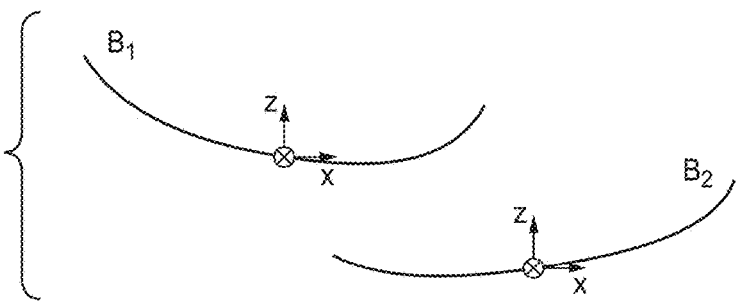
F I G. 12C
F I G. 12D
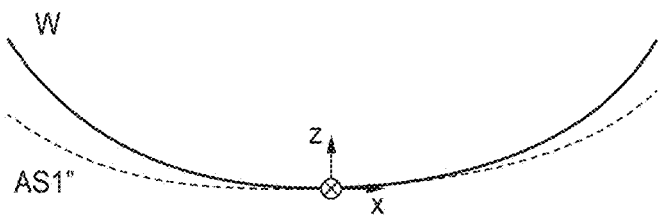
F I G. 12E
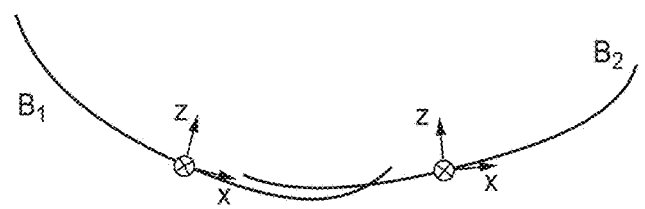
F I G. 12F
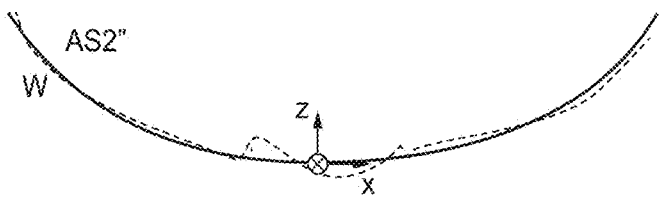

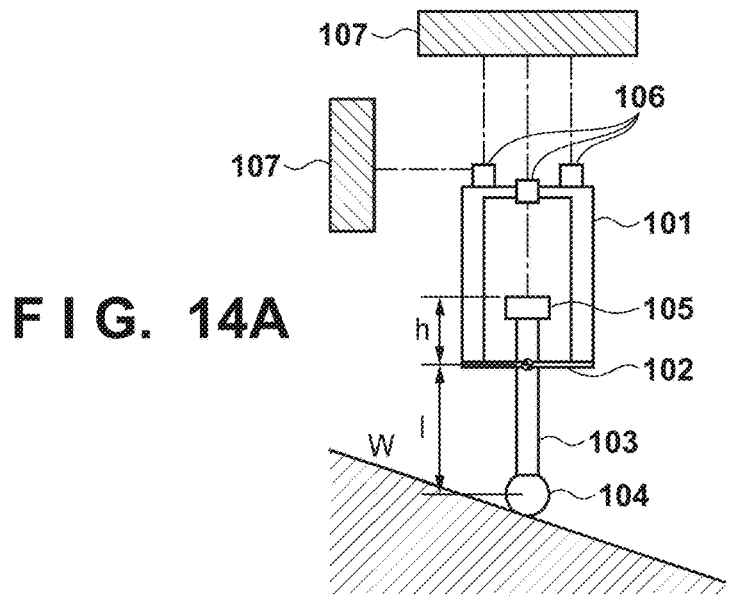
F I G. 14A
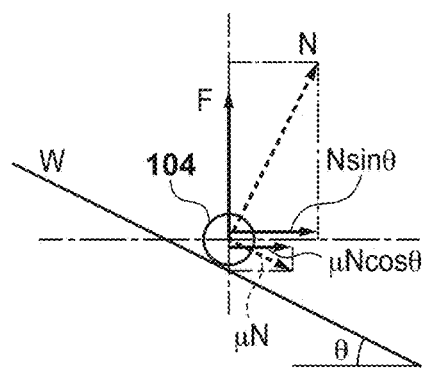
F I G. 14B
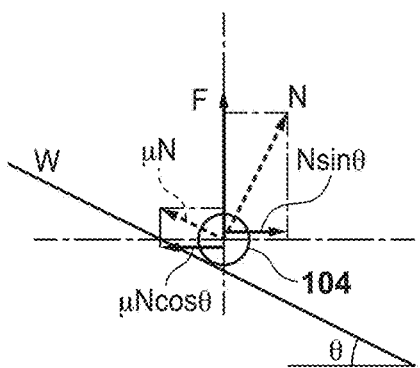
F I G. 14C
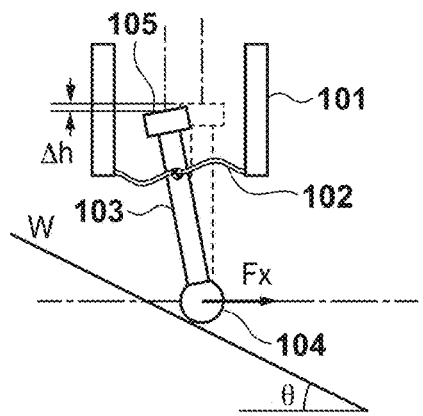
F I G. 14D
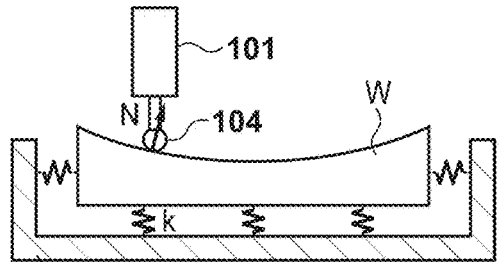
F I G. 14E F I G. 15
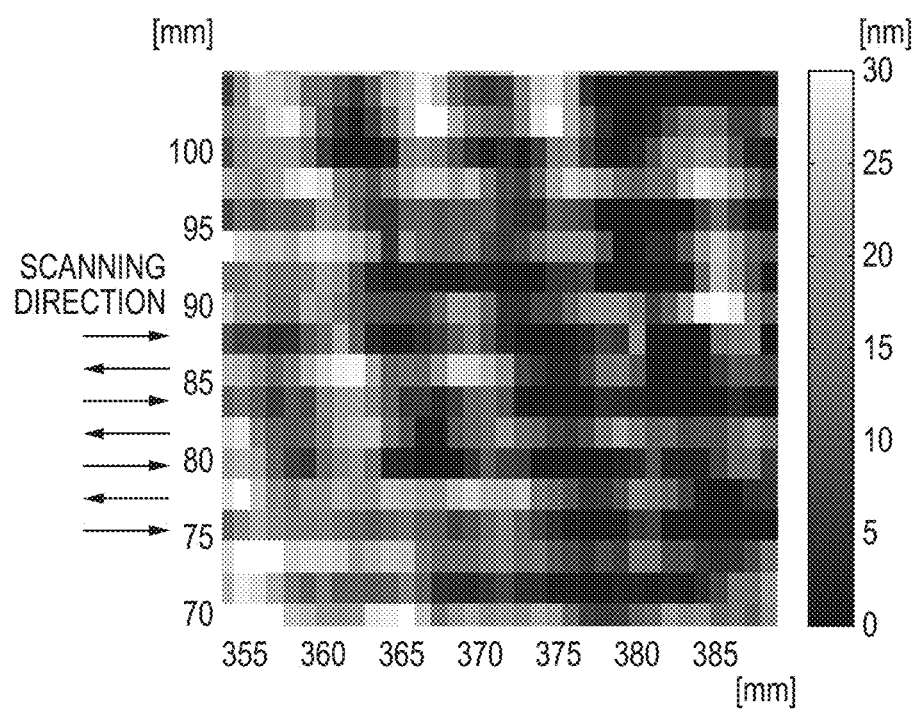

CALCULATION METHOD, STORAGE MEDIUM, INFORMATION PROCESSING APPARATUS, AND MEASUREMENT APPARATUS

BACKGROUND OF THE INVENTION

Field of the Invention

The present invention relates to a calculation method, storage medium, information processing apparatus, and measurement apparatus.

Description of the Related Art

As a measurement apparatus for accurately measuring the three-dimensional shape of a measurement object such as an optical element or mold, Japanese Patent No. 3272952 has proposed a scanning type measurement apparatus which obtains shape data of a measurement object by scanning a measurement probe on the measurement object. That is, Japanese Patent No. 3272952 has disclosed a measurement apparatus which brings a measurement probe into contact with a measurement target surface, detects a reaction force at the contact point, and scans the measurement probe along the measurement target surface while controlling the reaction force to a predetermined value, thereby rapidly obtaining shape data of the measurement target surface at a high resolution.

When scanning the measurement probe in contact with the measurement target surface, the following two problems arise.

(1) A friction force is generated at the contact point, and this causes an error with respect to a contact force to be controlled.

(2) The contact force displaces the measurement target surface, and this causes an error with respect to the contact point.

These problems become serious especially when the measurement target surface partially or entirely has an inclination angle with respect to the scanning direction of the measurement probe.

Due to these error factors, shape data of the measurement target surface contains a measurement error which changes in accordance with the scanning direction of the measurement probe. This means that, for example, when the scanning pattern of the measurement probe is a raster pattern, as shown in FIG. 15, a discontinuous stepped error significantly occurs between adjacent shape data (data lines). This stepped error can be regarded as a shape error of a high-order spatial frequency component which appears depending on the scanning pitch of the measurement probe. Therefore, an averaging process or weighted averaging process can be performed on adjacent shape data, but these processes decrease the resolution of shape data of the whole measurement target surface.

Japanese Patent Laid-Open Nos. 2012-168001 and 2005-156235 have proposed techniques for solving the problems concerning the inclination and friction of the measurement target surface when scanning the measurement probe. Japanese Patent Laid-Open No. 2012-168001 has disclosed a measurement apparatus including a driving mechanism which drives a measurement probe in the Z-axis direction. This measurement apparatus detects a force generated on the measurement probe in the X-axis direction when scanning the measurement probe on an inclined surface, and, if this force exceeds a threshold value, reduces a change in contact force by driving the measurement probe in the Z-axis direction.

Also, the force generated on the measurement probe in the X-axis direction when scanning the measurement probe downward along the inclined surface is smaller than that when scanning the measurement probe upward along the inclined surface. Therefore, Japanese Patent Laid-Open No 2005-156235 has disclosed a measurement method of accurately obtaining the shape of a measurement target surface by adopting only shape data obtained when the X-axis-direction force which causes a measurement error is small, that is, obtained when scanning the measurement probe downward along an inclined surface.

Unfortunately, the measurement apparatus disclosed in Japanese Patent Laid-Open No. 2012-168001 requires a detection mechanism for detecting the X-axis-direction force generated on the measurement probe, and a driving mechanism for driving the measurement probe in the Z-axis direction. These mechanisms complicate the apparatus configuration and increase the weight of the measurement probe. Accordingly, it is unrealistic to construct the measurement apparatus as disclosed in Japanese Patent Laid-Open No. 2012-168001.

Also, the measurement method disclosed in Japanese Patent Laid-Open No. 2005-156235 does not adopt shape data obtained when scanning the measurement probe upward along an inclined surface. This decreases the resolution of shape data of the whole measurement target surface to about ½. To suppress this decrease in resolution, it is necessary to, for example, scan the measurement probe twice for one data line. This doubles the time required to measure the shape of the measurement target surface.

SUMMARY OF THE INVENTION

The present invention provides a measurement method advantageous in accurately measuring the shape of a measurement target surface within a short time.

According to one aspect of the present invention, there is provided a calculation method of calculating a shape of a measurement target surface, including a first step of obtaining first shape measurement data which is obtained by measuring a line region of the measurement target surface while scanning a probe on the measurement target surface in a first direction, and represents a shape of the line region, and obtaining second shape measurement data which is obtained by measuring a line region of the measurement target surface while scanning the probe on the measurement target surface in a second direction different from the first direction, and represents a shape of the line region, and a second step of obtaining first corrected shape data by correcting the first shape measurement data by using a first correction parameter for correcting a measurement error caused by scanning the probe in the first direction, obtaining second corrected shape data by correcting the second shape measurement data by using a second correction parameter for correcting a measurement error caused by scanning the probe in the second direction, and generating first whole shape data representing a shape of the whole measurement target surface by synthesizing the first corrected shape data and the second corrected shape data.

Further aspects of the present invention will become apparent from the following description of exemplary embodiments with reference to the attached drawings.

BRIEF DESCRIPTION OF THE DRAWINGS

FIG. 3 is a flowchart for explaining the measurement method according to the first embodiment.

FIG. 5 is a flowchart for explaining the measurement method according to the second embodiment.

FIG. 7 is a flowchart for explaining the measurement method according to the third embodiment.

FIGS. 12A to 12F are views for explaining problems in stitching measurement.

FIGS. 14A to 14E are views for explaining a measurement apparatus for measuring the shape of a measurement target surface.

FIG. 15 is a view showing discontinuous stepped errors occurring between adjacent shape data.

DESCRIPTION OF THE EMBODIMENTS

Figure 1A:
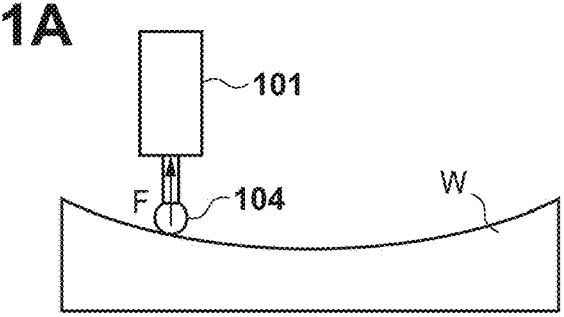
FIGS. 1A to 1C are views showing an outline of shape data of a measurement target surface.

Preferred embodiments of the present invention will be described below with reference to the accompanying drawings. Note that the same reference numerals denote the same members throughout the drawings, and a repetitive description thereof will not be given.

<First Embodiment>

First, a measurement apparatus for measuring the shape of a measurement target surface W will be explained with reference to FIGS. 14A to 14E. A gravity-direction reaction force generated on a measurement probe 101 when the measurement probe 101 is brought into contact with the measurement target surface W will be described below. In FIG. 14A, a scanning direction in which the measurement probe 101 is scanned is one-dimensional.

A driving stage (not shown) drives the measurement probe 101 on the measurement target surface W. The measurement probe 101 holds a probe shaft 103 via a leaf spring 102. The probe shaft 103 includes a probe sphere 104 which comes in contact with the measurement target surface W, and a probe mirror 105 which reflects measurement light for measuring the position of the probe shaft 103.

The measurement probe 101 includes a plurality of interferometers 106, and the position and posture of the measurement probe 101 can correctly be measured by irradiating a plurality of reference mirrors 107 on the measurement apparatus with measurement light. The interferometer 106 can measure the position of the probe mirror 105 with respect to the measurement probe 101.

From the relative displacement of the probe mirror 105 with respect to the measurement probe 101, a contact force at the contact point between the probe sphere 104 and measurement target surface W can be obtained based on the spring constant of the leaf spring 102. The driving stage drives the measurement probe 101 so that the contact force is constant, thereby scanning the measurement probe 101 in contact with the measurement target surface W. Consequently, the coordinates of the contact point of the probe sphere 104, that is, shape data of the measurement target surface W can be obtained as (a set of) coordinate data of the probe sphere 104.

The coordinate data of the probe sphere 104 is data obtained by the interferometer 106. For example, it is in principle possible to perform measurement on the order of nm to sub-nm by using a heterodyne interferometer as the interferometer 106 and managing the air-conditioning and temperature-control environments.

Problem (1) described in "BACKGROUND OF THE INVENTION" will be explained with reference to FIGS. 14B to 14D. As shown in FIG. 14B, when scanning the measurement probe 101 upward along the measurement target surface W at an inclination angle θ, control is so performed that the contact force, that is, the force in the Z-axis direction is constant. In this state, forces acting on the measurement probe 101 are a reaction force and friction force from the measurement target surface W. Of these forces acting on the measurement probe 101, a force acting in a direction other than the Z-axis direction, that is, a force containing another component inclines the measurement probe 101. Referring to FIG. 14B, an X-axis-direction force Fx acting on the measurement probe 101 is represented by:

$$Fx = N \sin \theta + \mu N \cos \theta \quad (1)$$

On the other hand, referring to FIG. 14C, when scanning the measurement probe 101 downward along the measurement target surface W at the inclination angle θ, the X-axis-direction force Fx acting on the measurement probe 101 is represented by:

$$Fx = N \sin \theta - \mu N \cos \theta \quad (2)$$

The product of the force Fx and a length l of the probe shaft 103 is the moment which bends the leaf spring 102 for holding the probe shaft 103. Letting K be the torsional rigidity of the leaf spring 102, an inclination φ of the probe shaft 103 is represented by:

$$\varphi = Fx \cdot l / K \quad (3)$$

As shown in FIG. 14D, when scanning the measurement probe 101 upward along the measurement target surface W, the inclination φ of the probe shaft 103 generates a positional error Δh of the probe mirror 105. The positional error Δh is represented by:

$$\Delta h = h(1 - \cos \varphi) \quad (4)$$

For example, Δh=10 [nm] when θ=30 [deg], μ=0.1, l=0.02 [m], h=0.01 [m], F=0.01 [N], and K=0.1 [Nm/rad], and this is a large error for the nm-order measurement as a target.

Problem (2) described in "BACKGROUND OF THE INVENTION" will be explained with reference to FIG. 14E. As shown in FIG. 14E, the measurement target surface W is supported by a supporting device H having a supporting eigen value ω. Letting m be the mass of the measurement target surface W, a spring constant k when the supporting device H supports the measurement target surface W is represented by:

$$k = m \omega^2 \quad (5)$$

A force N acting on the measurement target surface W is a function of the contact force F and inclination angle θ.

Equation N=kx of a spring displacement holds for this function. For example, spring constant k=228 [mN/mm] and displacement Δhwg of measurement target surface W=44 [nm] when F=0.01 [N], θ=30 [deg], ω=30 [Hz], and m=10 [kg], and this causes a large error for the nm-order measurement as a target. In this embodiment, the calculation is performed by assuming that the spring constant k is a translational eigen value in the Z-axis direction from the supporting eigen value ω. In practice, however, a moment acts on the measurement target surface W with respect to the barycenter of the measurement target surface W in accordance with a position where a load is applied. In this state, the rotational eigen value of the measurement target surface W generates an inclination, and this inclination causes a measurement error.

Also, as is apparent from equation (1) or (2), when the inclination angle θ changes with respect to the contact force F in the Z-axis direction, the force N generated on the measurement target surface W changes. Consequently, a displacement Δhwh occurs in the X-axis direction due to the supporting eigen value of the measurement target surface W in the X-axis direction, and this further causes an error.

The positional error Δh and displacement Δhwh are functions of the dynamic friction coefficient μ. Especially when the measurement target surface W is coated a lubricant, however, the dynamic friction coefficient μ changes in accordance with the scanning velocity or contact force of the measurement probe 101, and empirically becomes a variable matching a Stribeck curve. This means that an enormous amount of correction patterns are necessary when forming a measurement data correction table corresponding to the inclination angle θ of the measurement target surface W by measuring a standard beforehand.

Accordingly, the present invention provides a measurement method advantageous in accurately measuring the shape of the measurement target surface W within a short time by solving problems (1) and (2) described in "BACKGROUND OF THE INVENTION".

Figure 1B:
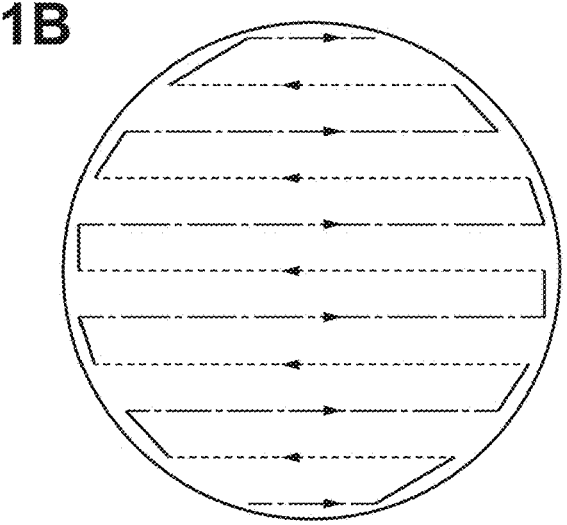
Figure 1C:
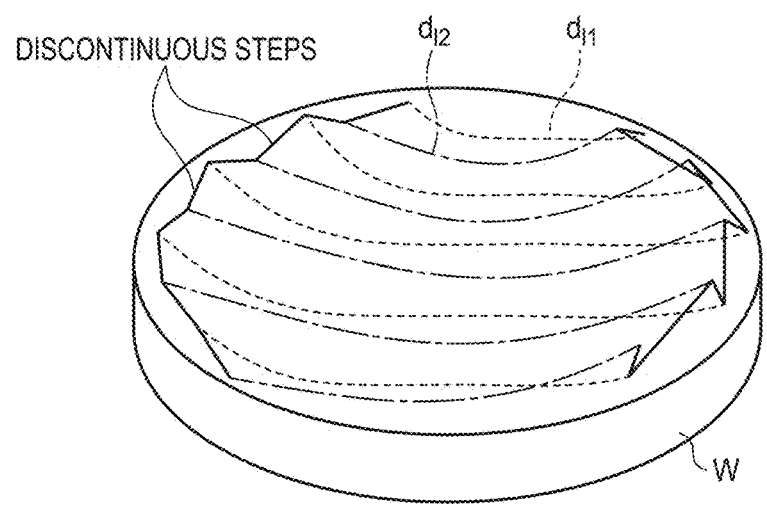

FIGS. 1A to 1C are views showing an outline of shape data of the measurement target surface W obtained by the measurement apparatus shown in FIG. 14A. As shown in FIG. 1A, coordinate data of the probe sphere 104, that is, shape data of the measurement target surface W is obtained by scanning the measurement probe 101 in a state in which the probe sphere 104 is in contact with the measurement target surface W. In this method, a raster pattern as shown in FIG. 1B is used as the scanning pattern of the measurement probe 101. In this raster pattern, the scanning directions of the measurement probe 101 are opposite when measuring adjacent line regions (data lines) of the measurement target surface W, and they are indicated by the broken line and alternate long and short dashed line. In this case, as shown in FIG. 1C, the measurement apparatus obtains first shape data dl1 representing the measured shape of a line region when the measurement probe 101 is scanned in a first direction, and second shape data dl2 representing the measured shape of a line region when the measurement probe 101 is scanned in the second direction. The first and second directions are different directions, for example, opposite directions. The first and second shape data dl1 and dl2 contain different measurement errors. Each of these measurement errors contained in the first and second shape data dl1 and dl2 is an error caused by the inclination angle θ of the measurement target surface W and the scanning direction of the measurement probe 101. When the first and second shape data dl1 and dl2 are directly synthesized, therefore, a discontinuous stepped error, that is, a shape error of a high-order spatial frequency component appears between the first and second shape data dl1 and dl2.

FIGS. 2A to 2E are views for explaining processing for shape data in the measurement method according to this embodiment. FIG. 3 is a flowchart for explaining the measurement method according to this embodiment. This measurement method can be executed by either a controller of the measurement method, or a processor of an information processing apparatus outside the measurement apparatus.

In step S11 (a first step), different line regions of the measurement target surface W are measured by scanning the measurement probe 101 on the measurement target surface W in the first and second directions, thereby obtaining shape data of these line regions, that is, the shape data shown in FIG. 1C.

Figure 2A:
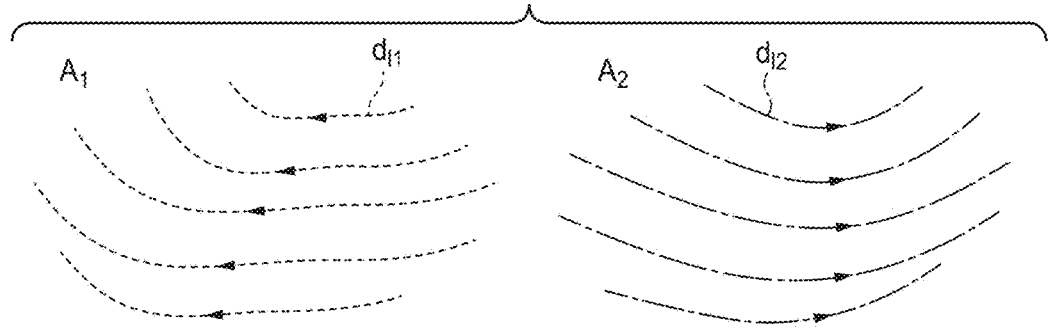
FIGS. 2A to 2E are views for explaining processing performed on shape data by a measurement method according to the first embodiment.

In step S12, the shape data obtained in step S11 is separated into the first shape data $d_{l1}$ representing the shape of the line region when scanning the measurement probe 101 in the first direction, and the second shape data $d_{l2}$ representing the shape of the line region when scanning the measurement probe 101 in the second direction. More specifically, as shown in FIG. 2A, first shape data $A_1$ containing only the first shape data $d_{l1}$ and second shape data $A_2$ containing only the second shape data $d_{l2}$ are defined. The first shape data $A_1$ is a set of data points $a_1$ containing the X-, Y-, and Z-axis components, and can be represented by a combination of a true shape $A_1'$ of the measurement target surface W and a measurement error $u_1$ caused by the scanning direction of the measurement probe 101. This similarly applies to the second shape data $A_2$. $A_1$, $A_2$, $A_1'$, $A_2'$, $a_1$, and $a_2$ are respectively defined by:

$$A_1 = A_1' \cdot u_1 \tag{6}$$

$$A_2 = A_2' \cdot u_2 \tag{7}$$

$$A_1' = [a_{11}, a_{12}, \ldots, a_{1i}, \ldots, a_{1n}] \tag{8}$$

$$A_2' = [a_{21}, a_{22}, \ldots, a_{2j}, \ldots, a_{2m}] \tag{9}$$

$$a_{1i} = [x_{1i}, y_{1i}, z_{1i}] \tag{10}$$

$$a_{2j} = [x_{2j}, y_{2j}, z_{2j}] \tag{11}$$

In equations (6) and (7), symbol "·" means that a parameter acts on the shape data. The "action" herein mentioned includes not only simple integration of the shape data and parameter, but also integration or addition/subtraction of the shape data and a shape calculated from the parameter, and does not indicate only the product of a matrix as a general mathematical description. In other words, "the shape data $A_1$ is measured as a combination of the true shape $A_1'$ and measurement error $u_1$" is expressed as "the shape data $A_1$ is obtained as a measurement result when the measurement error $u_1$ acts on the true shape $A_1'$". Note that symbol "·" will be handled in the same manner as described above hereinafter.

In the first shape data $A_1$ or second shape data $A_2$, the scanning directions of the individual shape data are the same. Therefore, measurement errors caused by the scanning directions of the measurement probe 101 are not different between the shape data, so the shape data are not discontinuous.

In the following description, each of the first and second shape data $A_1$ and $A_2$ will be explained with reference to only one shape data in order to facilitate understanding the invention. However, the present invention is not limited to this.

In step S13-1, a scanning correction parameter (first correction parameter) $P_1$ is set as a parameter to be given to the first shape data $d_{11}$. Likewise, in step S13-2, a scanning correction parameter (second correction parameter) $P_2$ is set as a parameter to be given to the second shape data $d_{12}$. The scanning correction parameter $P_1$ is a parameter for correcting a measurement error caused by scanning the measurement probe 101 in the first direction. The scanning correction parameter $P_2$ is a parameter for correcting a measurement error caused by scanning the measurement probe 101 in the second direction.

Figure 2B:
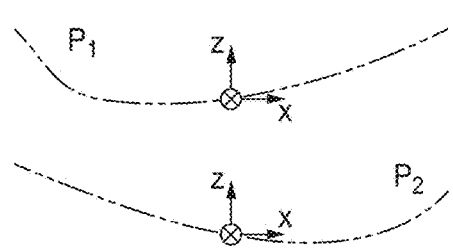

FIG. 2B shows the scanning correction parameters $P_1$ and $P_2$ by the alternate long and two short dashed lines. The scanning correction parameters $P_1$ and $P_2$ are respectively set as functions as indicated by:

$$P_1 = P_1(x_1, y_1) \quad (12)$$

$$P_2 = P_2(x_2, y_2) \quad (13)$$

The scanning correction parameters $P_1$ and $P_2$ can return a coordinate value z to arbitrary inputs x and y, and can also return coordinate values x', y', and z to arbitrary inputs x and y. The former is equivalent to, for example, an error in the Z-axis direction caused by the inclination of the axis of the measurement probe 101. The latter is equivalent to, for example, an error in the in-plane direction caused when the contact point of the probe sphere 104 and the probe mirror 105 do not exist on the same Z coordinate because the axis of the measurement probe 101 is inclined.

The use of orthogonal polynomials as a function in a given measurement region of the measurement target surface W facilitates calculations, so it is preferable to use orthogonal polynomials as the scanning correction parameters $P_1$ and $P_2$. Practical examples of the orthogonal polynomials are the Zernike polynomials and XY polynomials orthogonalized by Gram-Schmidt orthogonalization.

Figure 2C:
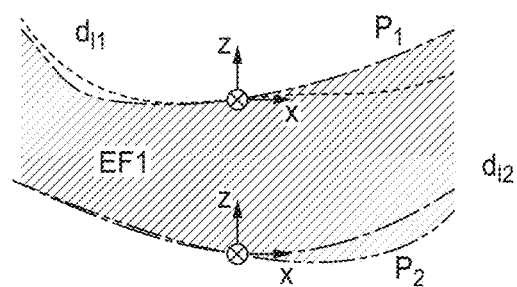

The use of the scanning correction parameters $P_1$ and $P_2$ makes it possible to individually correct measurement errors contained in the first and second shape data $A_1$ and $A_2$. Consequently, an evaluation function EF1 as indicated by a hatched region in FIG. 2C is defined as indicated by equation (14) below. Thus, the evaluation function EF1 is set in step S14:

$$\mathrm{EF1} = (A_1 \cdot u_1 \cdot P_1 - A_2 \cdot u_2 \cdot P_2)^2 \quad (14)$$

Referring to equation (14), the evaluation function EF1 causes the scanning correction parameters $P_1$ and $P_2$ to act on the first and second shape data $A_1$ and $A_2$, respectively, and squares the difference. As shown in FIG. 2C, the evaluation function EF1 is equivalent to the square of the absolute value of a difference between coordinate values in the Z-axis direction in a region where shape data containing measurement error correction overlap each other. As the value of the evaluation function EF1 decreases, the matching between the shape data improves. This means that a measurement error caused by the scanning direction of the measurement probe 101 is minimized.

Figure 2D:
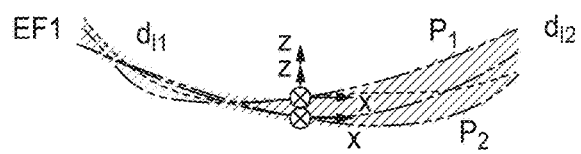

In step S15 (a third step), as shown in FIG. 2D, (the value of) the evaluation function EF1 is minimized by making the scanning correction parameters $P_1$ and $P_2$ variable. In other words, the scanning correction parameters $P_1$ and $P_2$ are determined to satisfy the relationships indicated by equations (15) and (16) below, so as to minimize the evaluation function EF1:

$$P_1 = u_1^{-1} \quad (15)$$

$$P_2 = u_2^{-1} \quad (16)$$

In equations (15) and (16), symbol "$v^{-1}$" represents a parameter. When the parameter $v^{-1}$ acts on an arbitrary parameter v, the parameters v and $v^{-1}$ cancel out each other and result in $v \cdot (v^{-1}) = 1$. The "action" herein mentioned includes not only simple integration of the shape data and parameter, but also integration or addition/subtraction of the shape data and a shape calculated from the parameter, and does not indicate only an inverse matrix as a general mathematical description. Note that symbol "$v^{-1}$" will be handled in the same manner as described above hereinafter.

For example, when an error model is a linear calculation, the solutions of the scanning correction parameters $P_1$ and $P_2$ which cancel the measurement errors $u_1$ and $u_2$ are simultaneously and uniquely obtained by the linear least-squares method. Also, even when nonlinear calculations are necessary, it is readily possible to determine the scanning correction parameters $P_1$ and $P_2$ by the nonlinear least-squares method or a solution method using singular value decomposition.

An example in which the evaluation function EF1 is minimized has been explained, but the present invention is not limited to this. For example, the first and second shape data $A_1$ and $A_2$ are corrected while changing the scanning correction parameters $P_1$ and $P_2$, and (the value of) the evaluation function EF1 is obtained whenever the scanning correction parameters $P_1$ and $P_2$ are changed. Then, the scanning correction parameters $P_1$ and $P_2$ can be determined so that the evaluation function EF1 falls within an allowable range.

Figure 2E:
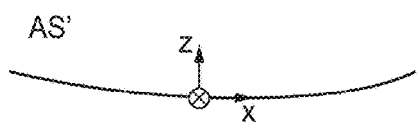

In step S16 (a second step), as shown in FIG. 2E, whole shape data (first whole shape data) AS' representing the shape of the whole measurement target surface W is generated by using the scanning correction parameters $P_1$ and $P_2$ determined by minimizing the evaluation function EF1 in step S15. More specifically, first corrected shape data is obtained by correcting the first shape data $A_1$ by the scanning correction parameter $P_1$, and second corrected shape data is obtained by correcting the second shape data $A_2$ by the scanning correction parameter $P_2$. Then, the whole shape data AS' is generated by synthesizing the first and second corrected shape data. It will be understood that the whole shape data AS' is generated by using all of the first and second shape data $d_{11}$ and $d_{12}$, and the resolution is maintained. Note that the whole measurement target surface W includes not only the entire surface of the measurement target surface W, but also the entire surface of a measurement target region.

The measurement method of this embodiment can accurately measure the shape of the measurement target surface W within a short time even when shape data measured by scanning the measurement probe 101 on the measurement target surface W contains a measurement error caused by the scanning direction of the measurement probe 101.

<Second Embodiment>

In the first embodiment, a stepped error caused by the scanning direction of the measurement probe 101, that is, a shape error of a high-order spatial frequency component can be reduced by correcting the first and second shape data $A_1$ and $A_2$ by using the scanning correction parameters $P_1$ and $P_2$. In practice, however, the measurement target surface W has divergence from a designed shape as a real shape.

Figure 4A:
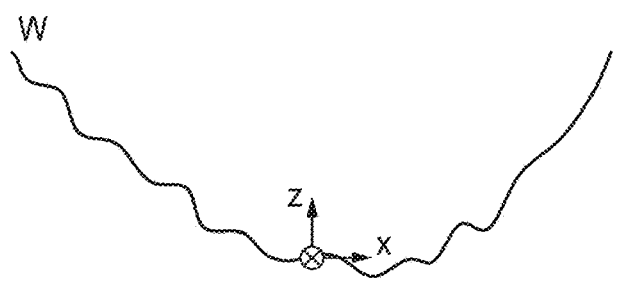
FIGS. 4A to 4C are views for explaining processing performed on shape data by a measurement method according to the second embodiment.
Figure 4B:
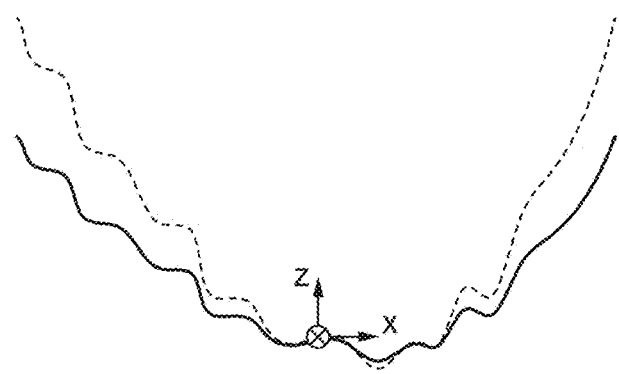
Figure 4C:
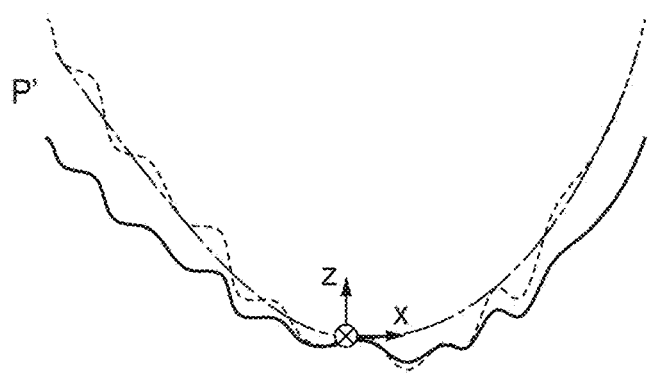

In this embodiment, a case in which the shape of the measurement target surface W contains a shape error of a high-order spatial frequency will be explained. FIGS. 4A to 4C are views for explaining processing for shape data in a measurement method according to this embodiment. FIG. 5 is a flowchart for explaining the measurement method according to this embodiment. Note that steps S21, S22, S23, S24, S25, and S26 shown in FIG. 5 are the same as steps S11, S12, S13, S14, S15, and S16 shown in FIG. 3, so a detailed explanation thereof will be omitted.

FIG. 4A is a sectional view showing the real shape of the measurement target surface W. In step S21, the shape data shown in FIG. 1C is obtained by measuring different line regions of the measurement target surface W while scanning the measurement probe 101 on the measurement target surface W in the first and second directions. The real shape of the measurement target surface W contains a local high-order spatial frequency shape error which is much smaller than the inclination of the measurement target surface W but larger than the required measurement accuracy (for example, the order of nm). FIG. 4A shows the real shape of the measurement target surface W by changing the scale. In practice, however, the inclination of the shape of the measurement target surface W is on the order of mm, but the local shape error is on the order of nm.

In this case, if the scanning correction parameters $P_1$ and $P_2$ are unlimitedly set as in the first embodiment, a high-order shape error contained in the real shape of the measurement target surface W may be corrected in addition to a measurement error between shape data caused by the scanning direction of the measurement probe 101. This makes it impossible to accurately measure the shape error contained in the real shape of the measurement target surface W.

The measurement error caused by the scanning direction of the measurement probe 101 can be represented by equations (4) and (5), and hence is regarded as a shape error of a relatively low-order spatial frequency component. Referring to shape data indicated by the dotted lines in FIG. 4B, the shape of a high-order spatial frequency component is measured, but the shape data probably contains a measurement error caused by the scanning direction of the measurement probe 101, that is, a shape error of a low-order spatial frequency component.

In this embodiment, therefore, in step S23-1, a scanning correction parameter $P_1$ limited to a relatively low-order spatial frequency component is set as a parameter to be given to first shape data $d_{11}$, as indicated by an alternate long and short dashed line P' in FIG. 4C. Similarly, in step S23-2, a scanning correction parameter $P_2$ limited to a relatively low-order spatial frequency component is set as a parameter to be given to second shape data $d_{12}$. By thus limiting the scanning correction parameters $P_1$ to $P_2$ to only low-order spatial frequency components, as shown in FIG. 4C, it is possible to correct only a measurement error caused by the scanning direction of the measurement probe 101 while accurately measuring the shape of a high-order spatial frequency component.

The scanning correction parameters $P_1$ and $P_2$ correct adjacent shape data different in scanning direction of the measurement probe 101, and it is unnecessary to correct a spatial frequency component having an order higher than the interval between the shape data. Therefore, the scanning correction parameters $P_1$ and $P_2$ should contain a spatial frequency component having an order lower than the interval between the first and second shape data $A_1$ and $A_2$. Also, the scanning correction parameters $P_1$ and $P_2$ can freely be set as low-order spatial frequency components based on a spatial frequency necessary to measure the measurement target surface W. When the shape of the measurement target surface W is relatively simple, shapes (low-order shapes) corresponding to the fourth to ninth terms of the Zernike polynomials are often dominant in measurement errors caused by the scanning directions of the measurement probe 101 when the measurement errors are expressed by the Zernike polynomials. In this case, the scanning correction parameters $P_1$ and $P_2$ need only be so set as to contain the spatial frequency components corresponding to the fourth to ninth terms of the Zernike polynomials.

<Third Embodiment>

In this embodiment, a case in which the measurement target surface W has an error shape of a low-order spatial frequency will be explained in addition to the second embodiment. When a scanning correction parameter limited to a low-order spatial frequency component acts on shape data containing the real shape of the measurement target surface W, not only a measurement error but also the low-order shape itself of the measurement target surface W may be corrected. For example, when the low-order shapes of adjacent shape data of the measurement target surface W become extremely small, an evaluation function may be minimized although the corrected data is not close to the real shape of the measurement target surface W. Also, matching with adjacent shape data need only be obtained regardless of how the low-order shape of the measurement target surface W changes. Depending on the type of evaluation function, however, the shape of the measurement target surface W and the scanning correction parameter are not uniquely determined and do not converge in some cases. This means that the shape of the measurement target surface W cannot accurately be measured.

In the first and second embodiments, therefore, a high-order spatial frequency shape error can be reduced, but a lower-order spatial frequency shape error may occur depending on the shape of the measurement target surface W.

In this embodiment, a case in which the shape of the measurement target surface W particularly contains a low-order spatial frequency shape error will be explained. FIGS. 6A to 6H are views for explaining processing for shape data in a measurement method according to this embodiment. FIG. 7 is a flowchart for explaining the measurement method according to this embodiment. Note that steps S31 to S36 shown in FIG. 7 are the same as steps S11 to S16 shown in FIG. 3, so a detailed explanation thereof will be omitted.

Figure 6A:
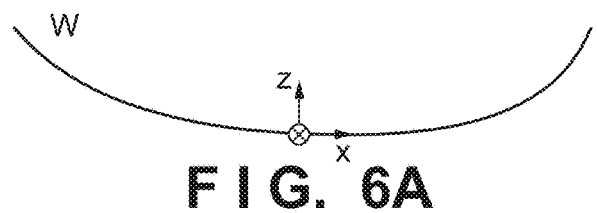
FIGS. 6A to 6H are views for explaining processing performed on shape data by a measurement method according to the third embodiment.
Figure 6B:
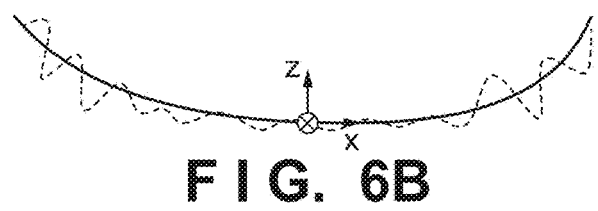
Figure 6C:
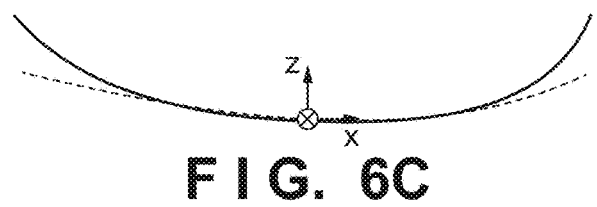

FIG. 6A is a sectional view showing the real shape of the measurement target surface W. In step S31, the shape data shown in FIG. 1C is obtained by measuring different line regions of the measurement target surface W while scanning a measurement probe 101 on the measurement target surface W in the first and second directions. FIG. 6B shows the section of shape data of the measurement target surface W obtained by the related art, that is, shows the section of the shape data shown in FIG. 1C by the dotted lines. FIG. 6B also shows the section of the real shape of the measurement target surface W by the solid line. On the other hand, FIG. 6C shows the shape data of the measurement target surface W obtained in the first embodiment, that is, shows the section of whole shape data AS' by the dotted line. FIG. 6C also shows the section of the real shape of the measurement target surface W by the solid line.

Figure 6D:
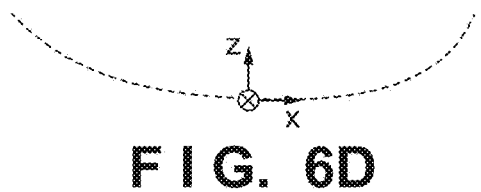
Figure 6E:

Referring to FIGS. 6A to 6C, in the shape data of the measurement target surface W obtained by the related art, a stepped high-order spatial frequency component shape error is particularly large, but the shape of a relatively moderate low-order spatial frequency component has a small error. When the shape data of the measurement target surface W obtained by the related art is separated into the low- and high-order spatial frequency components by using a spatial filter, shape data shown in FIGS. 6D and 6E are obtained. Referring to FIGS. 6D and 6E, a low-order shape as a low-order spatial frequency component is calculated at a sufficient accuracy, but a high-order shape as a high-order spatial frequency component contains an obvious error caused by stitching.

Figure 6F:
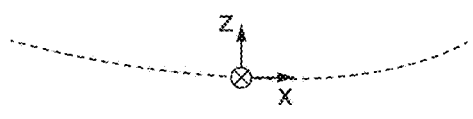
Figure 6G:
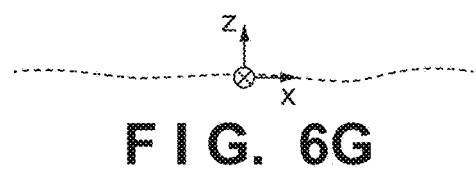

On the other hand, in the shape data of the measurement target surface W obtained in the first embodiment, a stepped high-order spatial frequency component shape error is reduced, but the shape of a relatively moderate low-order spatial frequency component may increase an error because the shape changes due to a scanning correction parameter. When the shape data of the measurement target surface W obtained in the first embodiment is separated into low- and high-order spatial frequency components by using a spatial filter, shape data shown in FIGS. 6F and 6G are obtained. Referring to FIGS. 6F and 6G, a low-order shape as a low-order spatial frequency component is evidently lost, but a high-order shape as a high-order spatial frequency component is reproduced at a sufficient accuracy.

Accordingly, the measurement method according to this embodiment includes the following steps. In step S37-1 (a fourth step), the whole shape data AS' generated in step S36 is separated into the high-order spatial frequency component shape data (high-order shape component) as shown in FIG. 6G, and the low-order spatial frequency component shape data (low-order shape component) having an order equal to or lower than a predetermined order as shown in FIG. 6F. In other words, shape data of a spatial frequency component having an order higher than the predetermined order is extracted from the whole shape data AS'.

In step S37-2 (a fifth step), shape data of the measurement target surface W obtained by the related art, that is, the shape data shown in FIG. 1C is separated into the high-order spatial frequency component shape data shown in FIG. 6E, and the low-order spatial frequency component shape data having an order equal to or lower than a predetermined order shown in FIG. 6D. In other words, shape data of a low-order spatial frequency component having an order equal to or lower than the predetermined order is extracted from the shape data shown in FIG. 1C.

Figure 6H:
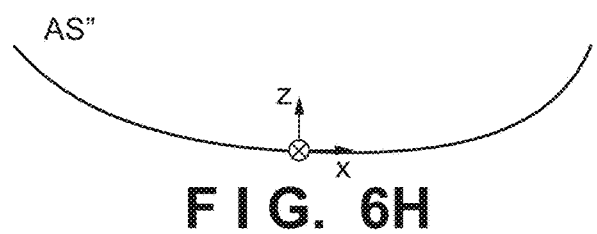

In step S38 (a sixth step), as shown in FIG. 6H, whole shape data (second whole shape data) AS" representing the shape of the whole measurement target surface W is generated by synthesizing the high-order shape component separated (extracted) in step S37-1 and the low-order shape component separated (extracted) in step S37-2.

In this embodiment, the low- and high-order shape components are preferably independent, and preferably contain the whole spatial frequency region. This makes it possible to synthesize the shapes of the individual spatial frequency regions by simple addition of the independent components, and obviates the need for any special shape synthesizing method.

The measurement method of this embodiment can avoid the possibility that the shape of a low-order spatial frequency component contains an error depending on the evaluation function, while reducing the high-order spatial frequency component shape error caused by the scanning direction of the measurement probe 101.

<Fourth Embodiment>

In this embodiment, so-called stitching measurement by which the measurement target surface W is measured as it is divided into a plurality of partial regions and the shape of the whole measurement target surface W is measured by synthesizing partial shape data obtained by the above measurement will be explained.

Figure 8A:
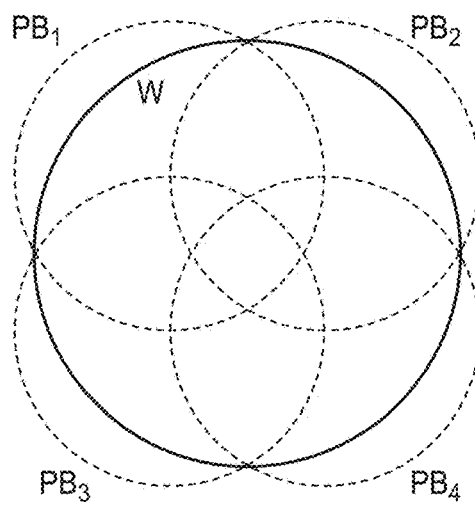
FIGS. 8A to 8D are views showing an outline of shape data of a measurement target surface.
Figure 8B:
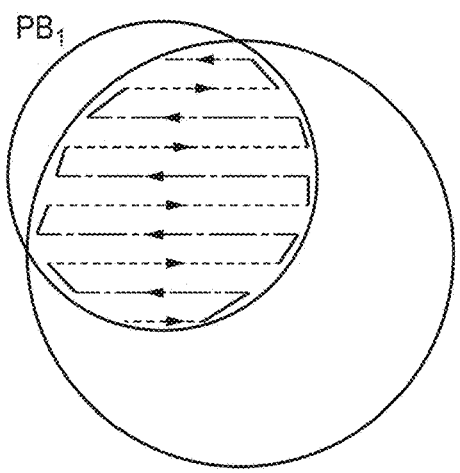

FIGS. 8A to 8D are views showing an outline of shape data of the measurement target surface W obtained by the measurement apparatus shown in FIG. 14A. As shown in FIG. 8A, for example, a plurality of partial regions $PB_1$, $PB_2$, $PB_3$, and $PB_4$ as indicated by the broken lines are set in the measurement target surface W. By scanning a measurement probe 101 in a state in which a probe sphere 104 is in contact with each of the partial regions $PB_1$ to $PB_4$, coordinate data of the probe sphere 104, that is, shape data of the measurement target surface W is obtained. As shown in FIG. 8B, partial shape data $B_1$ of the partial region $PB_1$ contains an error caused by an inclination angle θ of the measurement target surface W and the scanning direction of the measurement probe 101, as described previously. If first and second shape data $d_{111}$ and $d_{112}$ contained in the partial shape data $B_1$ are directly synthesized, therefore, a discontinuous stepped error, that is, a shape error of a high-order spatial frequency component appears between the first and second shaped data $d_{111}$ and $d_{112}$.

Also, in stitching measurement, partial shape data $B_1$ to $B_4$ of the partial regions $PB_1$ to $PB_4$ must be so synthesized as to decrease their respective stitching errors. If the stitching errors are large, as shown in FIGS. 8C and 8D, stepped high-order spatial frequency component shape errors appear in regions (portions) where the partial regions $PB_1$ to $PB_4$ overlap each other.

In stitching measurement as described above, two different errors, that is, an error caused by an error of each shape data of a line region in the partial regions $PB_1$ to $PB_4$ and an error in the region where the partial regions $PB_1$ to $PB_4$ overlap occur.

Figure 9A:
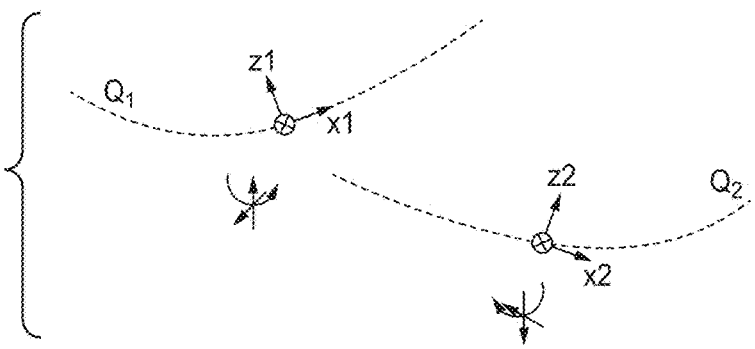
FIGS. 9A to 9D are views for explaining processing performed on shape data by a measurement method according to the fourth embodiment.

FIGS. 9A to 9D are views for explaining processing for shape data in a measurement method according to this embodiment. FIG. 10 is a flowchart for explaining the measurement method according to this embodiment. In this flowchart, a case in which the partial region (a first partial region) $PB_1$ and the partial region (a second partial region) $PB_2$ are stitched will be explained in order to facilitate understanding the invention.

Figure 8C:
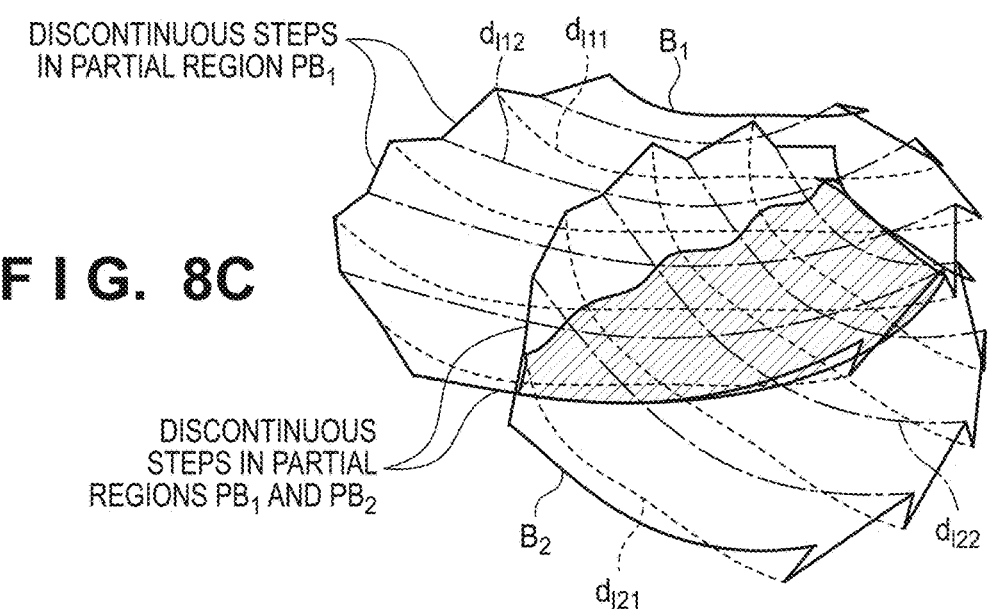
Figure 8D:
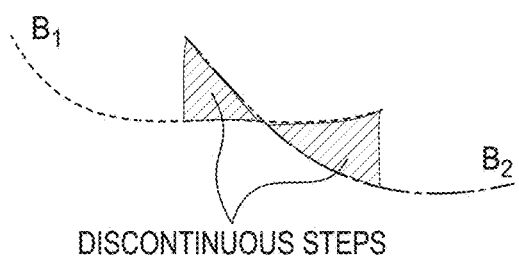

In step S41-1, the partial shape data (first partial shape data) $B_1$ shown in FIG. 8C is obtained by measuring different line regions of the partial region $PB_1$ of the measurement target surface W while scanning the measurement probe 101 on the partial region $PB_1$ in the first and second directions. Likewise, in step S41-2, the partial shape data (second partial shape data) $B_2$ shown in FIG. 8C is obtained by measuring different line regions of the partial region $PB_2$ of the measurement target surface W while scanning the measurement probe 101 on the partial region $PB_2$ in the first and second directions.

In step S42-1, the partial shape data $B_1$ obtained in step S41-1 is separated into the first and second shape data $d_{111}$ and $d_{112}$. The first shape data $d_{111}$ is data representing the shape of a line region when scanning the measurement probe 101 in the first direction. The second shape data $d_{112}$ is data representing the shape of a line region when scanning the measurement probe 101 in the second direction. More specifically, first shape data $A_{11}$ containing only the first shape data $d_{111}$ and second shape data $A_{12}$ containing only the second shape data $d_{112}$ are defined. The first shape data $A_{11}$ is a set of data points $a_{11}$ containing the X-, Y-, and Z-axis components, and can be represented by a combination of a true shape $A_{11}'$ of the measurement target surface W and a measurement error $u_{11}$ caused by the scanning direction of the measurement probe 101. This similarly applies to the second shape data $A_{12}$. $A_{11}$, $A_{12}$, $A_{11}'$, $A_{12}'$, $a_{11}$, and $a_{12}$ are respectively defined by:

$$A_{11} = A_{11}' \cdot u_{11} \tag{17}$$

$$A_{12} = A_{12}' \cdot u_{12} \tag{18}$$

$$A_{11}' = [a_{111}, a_{112}, \ldots, a_{11i}, \ldots, a_{11n}] \tag{19}$$

$$A_{12}' = [a_{121}, a_{122}, \ldots, a_{12j}, \ldots, a_{12m}] \tag{20}$$

$$a_{11i} = [x_{11i}, y_{11i}, z_{11i}] \tag{21}$$

$$a_{12j} = [x_{12j}, y_{12j}, z_{12j}] \tag{22}$$

In the first shape data $A_{11}$ or second shape data $A_{12}$, the scanning directions of the individual shape data are the same. Therefore, measurement errors caused by the scanning directions of the measurement probe 101 are not different between the shape data, so the shape data are not discontinuous.

In step S42-2, the partial shape data $B_2$ obtained in step S41-2 is separated into first and second shape data $d_{121}$ and $d_{122}$, in the same manner as in step S42-1. The first shape data $d_{121}$ is data representing the shape of a line region when scanning the measurement probe 101 in the first direction. The second shape data $d_{122}$ is data representing the shape of a line region when scanning the measurement probe 101 in the second direction. More specifically, first shape data $A_{21}$ containing only the first shape data $d_{121}$ and second shape data $A_{22}$ containing only the second shape data $d_{122}$ are defined.

In the following description, each of the first and second shape data $A_{11}$ and $A_{12}$ and the first and second shape data $A_{22}$ and $A_{22}$ will be explained with reference to only one shape data in order to facilitate understanding the invention. However, the present invention is not limited to this.

In step S43-11, a scanning correction parameter $P_{11}$ is set as a parameter to be given to the first shape data $A_{11}$. Likewise, in step S43-12, a scanning correction parameter $P_2$ is set as a parameter to be given to the second shape data $A_{12}$. The scanning correction parameter $P_{11}$ is a parameter for correcting a measurement error caused by scanning the measurement probe 101 in the first direction. The scanning correction parameter $P_{12}$ is a parameter for correcting a measurement error caused by scanning the measurement probe 101 in the second direction.

Figure 9B:
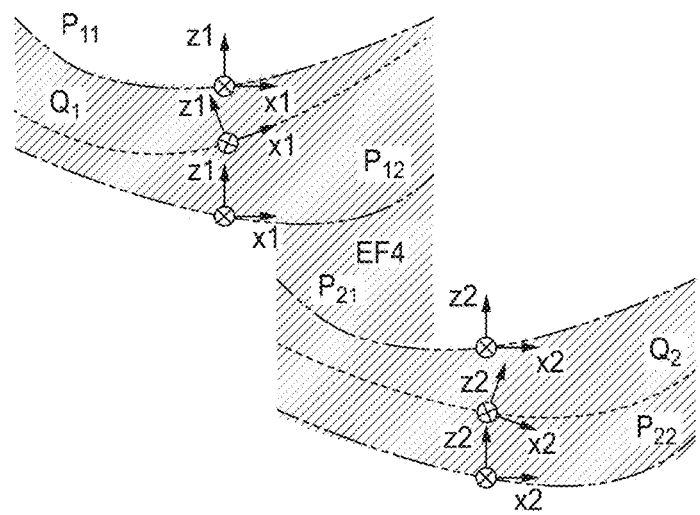
Figure 10:
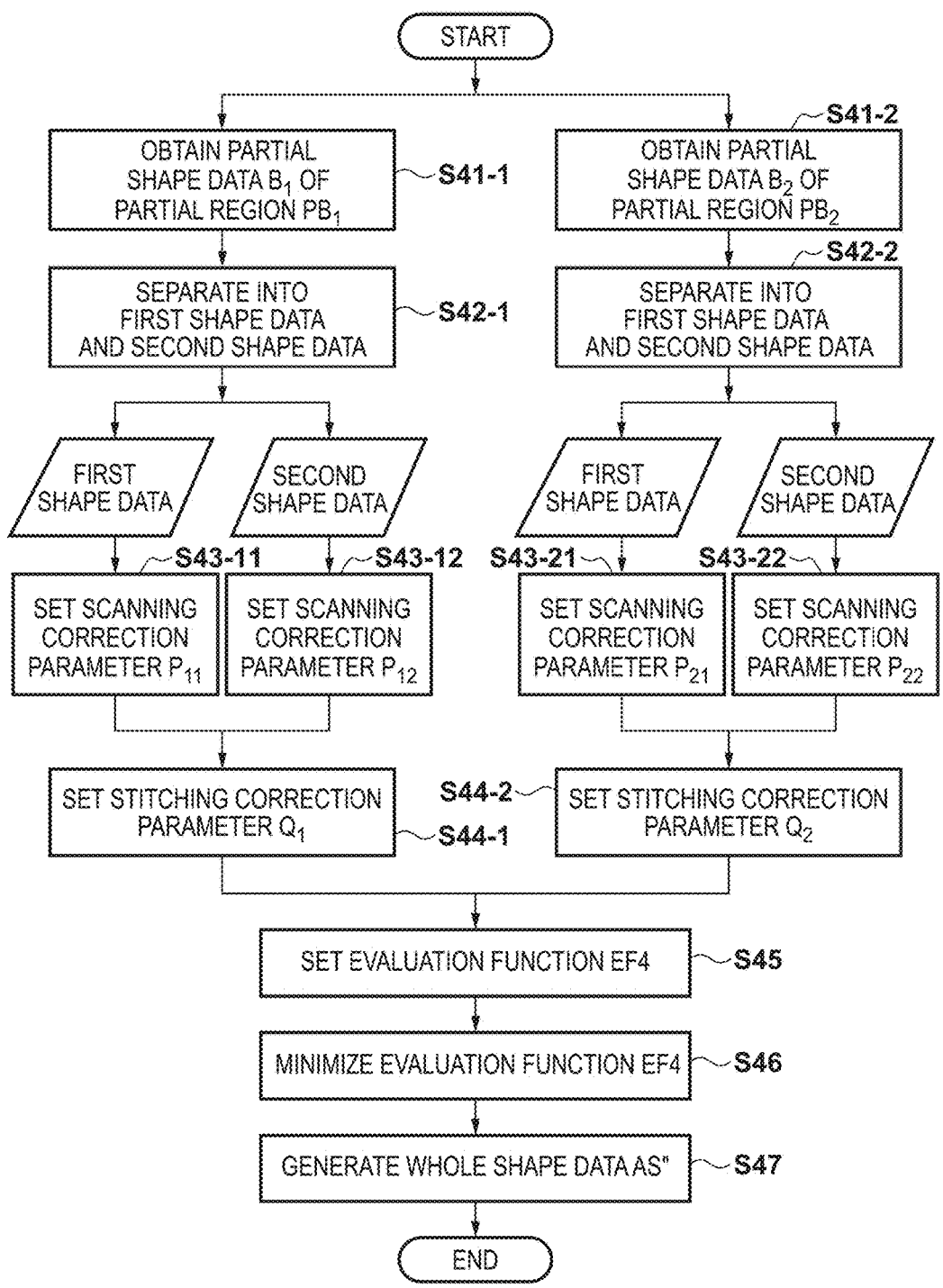
FIG. 10 is a flowchart for explaining the measurement method according to the fourth embodiment.

FIG. 9B shows the scanning correction parameters $P_{11}$ and $P_{22}$ by the alternate long and two short dashed lines. The scanning correction parameters $P_{11}$ and $P_{22}$ are respectively set as functions as indicated by:

$$P_{11} = P_{11}(x_{11}, y_{11}) \tag{23}$$

$$P_{12} = P_{12}(x_{12}, y_{12}) \tag{24}$$

The scanning correction parameters $P_{11}$ and $P_{12}$ can return a coordinate value z to arbitrary inputs x and y, and can also return coordinate values x', y', and z to arbitrary inputs x and y. It is preferable to adopt the Zernike polynomials or XY polynomials orthogonalized by Gram-Schmidt orthogonalization as the scanning correction parameters $P_{11}$ and $P_{12}$.

Similarly, in step S43-21, a scanning correction parameter $P_{21}$ is set as a parameter to be given to the first shape data $A_{21}$, and a scanning correction parameter $P_{22}$ is set as a parameter to be given to the second shape data $A_{22}$.

In step S44-1 as shown in FIG. 9A, a stitching correction parameter (third correction parameter) $Q_1$ is set as a parameter to be given to the partial shape data $B_1$. Likewise, in step S44-2 as shown in FIG. 9A, a stitching correction parameter (fourth correction parameter) $Q_2$ is set as a parameter to be given to the partial shape data $B_2$.

In stitching measurement, the partial shape data $B_1$ and $B_2$ are synthesized in order to obtain the shape of the whole measurement target surface W. In this case, each partial shape data has a stitching error t. In the shape data $B_1$ of the partial region $PB_1$, a true shape $B_1'$ of the partial region $B_1$ and a stitching error $t_1$ are represented by:

$$B_1 = B_1' \cdot t_1 \tag{25}$$

Examples of the stitching error $t_1$ are a posture error such as a positional shift or inclination in each partial region, a system error unique to the measurement apparatus and common to all partial regions, and a measurement error which changes from one partial region to another. These errors are corrected by the stitching correction parameters in stitching calculations. The stitching correction parameter $Q_1$ is set as a function as indicated by:

$$Q_1 = Q_1(x_1, y_1) \tag{26}$$

The stitching correction parameter $Q_1$ is a parameter for correcting a posture error such as a positional shift or inclination of each partial region, a system error unique to the measurement apparatus and common to all partial regions, or the like. The stitching correction parameter $Q_1$ can be represented by a coordinate transformation matrix as a posture error, by a function such as the Zernike polynomials for expressing an error, or a combination thereof.

Also, a true shape $B_2'$ of the partial region $PB_2$, a stitching error $t_2$, and the stitching correction parameter $Q_2$ are similarly set for the partial shape data $B_2$ of the partial region $PB_2$.

Measurement errors contained in the first and second shape data $A_{11}$ and $A_{12}$ and first and second shape data $A_{21}$ and $A_{22}$ can individually be corrected by using the scanning correction parameters $P_{11}$, $P_{12}$, $P_{21}$, and $P_{22}$. In addition, stitching errors contained in the partial shape data $B_1$ and $B_2$ can individually be corrected by using the stitching correction data $Q_1$ and $Q_2$. Consequently, an evaluation function EF4 as indicated by the hatched region in FIG. 9B is defined as indicated by equation (27) below. The evaluation function EF4 is thus set in step S45.

$$EF4 = \{(A_{11}' \cdot u_{11} \cdot P_{11} - A_{12}' \cdot u_{12} \cdot P_{12}) \cdot Q_1 - (A_{21}' \cdot u_{21} \cdot P_{21} - A_{22}' \cdot u_{22} \cdot P_{22}) \cdot Q_2\}^2 \tag{27}$$

Referring to equation (27), the evaluation function EF4 causes the scanning correction parameters to act on the first and second shape data, causes the stitching correction parameters to act on the difference, and squares the difference. As shown in FIG. 9B, the evaluation function EF4 is equivalent to a difference between coordinate values in the Z-axis direction in a region where shape data containing measurement error correction and stitching error correction overlap each other. As the value of the evaluation function EF4 decreases, the matching between the shape data improves. This means that a measurement error and stitching error caused by the scanning direction of the measurement probe 101 decrease.

Figure 9C:
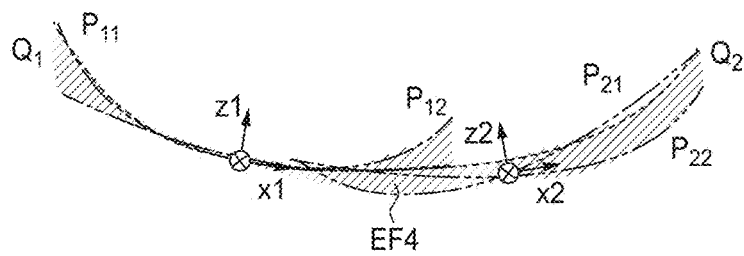

In step S46, as shown in FIG. 9C, (the value of) the evaluation function EF4 is minimized by making the scanning correction parameters $P_{11}$, $P_{12}$, $P_{21}$, and $P_{22}$ and stitching correction parameters $Q_1$ and $Q_2$ variable. In other words, the scanning correction parameters $P_{11}$, $P_{22}$, $P_{21}$, and $P_{22}$ and stitching correction parameters $Q_1$ and $Q_2$ are determined to satisfy the relationships indicated by equations (28) and (33) below, so as to minimize the evaluation function EF4:

$$P_{11} = u_{11}^{-1} \qquad (28)$$

$$P_{12} = u_{12}^{-1} \qquad (29)$$

$$P_{21} = u_{21}^{-1} \qquad (30)$$

$$P_{22} = u_{22}^{-1} \qquad (31)$$

$$Q_1 = t_1^{-1} \qquad (32)$$

$$Q_2 = t_2^{-1} \qquad (33)$$

For example, when an error model is a linear calculation, the solutions of the scanning correction parameters $P_{11}$, $P_{12}$, $P_{21}$, and $P_{22}$ and stitching correction parameters $Q_1$ and $Q_2$ are simultaneously and uniquely obtained by the linear least-squares method. Also, even when nonlinear calculations are necessary, it is readily possible to determine the scanning correction parameters $P_{11}$, $P_{12}$, $P_{21}$, and $P_{22}$ and stitching correction parameters $Q_1$ and $Q_2$ by the nonlinear least-squares method or a solution method using singular value decomposition. In this embodiment, when obtaining stitching correction parameters in general stitching calculations, it is possible to simultaneously obtain scanning correction parameters without particularly increasing the complexity of the calculations.

Figure 9D:
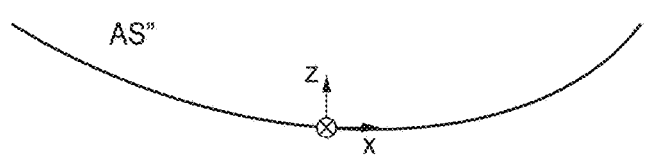

In step S47, as shown in FIG. 9D, whole shape data AS" representing the shape of the whole measurement target surface W is generated by using the scanning correction parameters $P_{11}$, $P_{12}$, $P_{21}$, and $P_{22}$ and stitching correction parameters $Q_1$ and $Q_2$ determined by minimizing the evaluation function EF4. It will be understood that the whole shape data (third whole shape data) AS" is generated by using all of the first and second shape data $d_{111}$ and $d_{112}$ and first and second shape data $d_{121}$ and $d_{122}$, and the resolution is maintained.

This embodiment has been explained by taking the case in which the partial regions $PB_1$ and $PB_2$ are stitched as an example. When stitching the partial regions $PB_1$, $PB_2$, $PB_3$, ..., $PB_n$, an evaluation function EF4$n$ need only be set as indicated by:

$$EF4n = \sum_i \sum_j \left\{ \begin{array}{l} (A'_{i1} \cdot u_{i1} \cdot P_{i1} - A'_{i2} \cdot u_{i2} \cdot P_{i2}) \cdot Q_i - \\ (A'_{j1} \cdot u_{j1} \cdot P_{j1} - A'_{j2} \cdot u_{j2} \cdot P_{j2}) \cdot Q_j \end{array} \right\}^2 \qquad (34)$$

Thus, the square of the absolute value of a difference between coordinate values in the Z-axis direction is calculated for each partial region, and the sum total is defined as an evaluation function. As a consequence, the matching between shape data improves as the evaluation function EF4$n$ decreases. This means that measurement errors caused by the scanning directions of the measurement probe 101 and stitching errors decrease. In addition, it is possible to readily determine scanning correction parameters and stitching correction parameters by the linear least-squares method, the nonlinear least-squares method, or a solution method using singular value decomposition, in this case as well.

The measurement method of this embodiment can accurately measure the shape of the measurement target surface W within a short time by reducing measurement errors caused by the scanning directions of the measurement probe 101 and stitching errors in stitching measurement of obtaining the whole shape by synthesizing a plurality of partial regions.

<Fifth Embodiment>

In the fourth embodiment, the method capable of reducing a stepped error caused by the scanning direction of the measurement target surface, that is, reducing a high-order spatial frequency component shape error by correcting shape data by using the scanning correction parameters and stitching correction parameters has been explained. In practice, however, the measurement target surface W has divergence from a designed shape as a real shape, as explained in the second embodiment.

Figure 11:
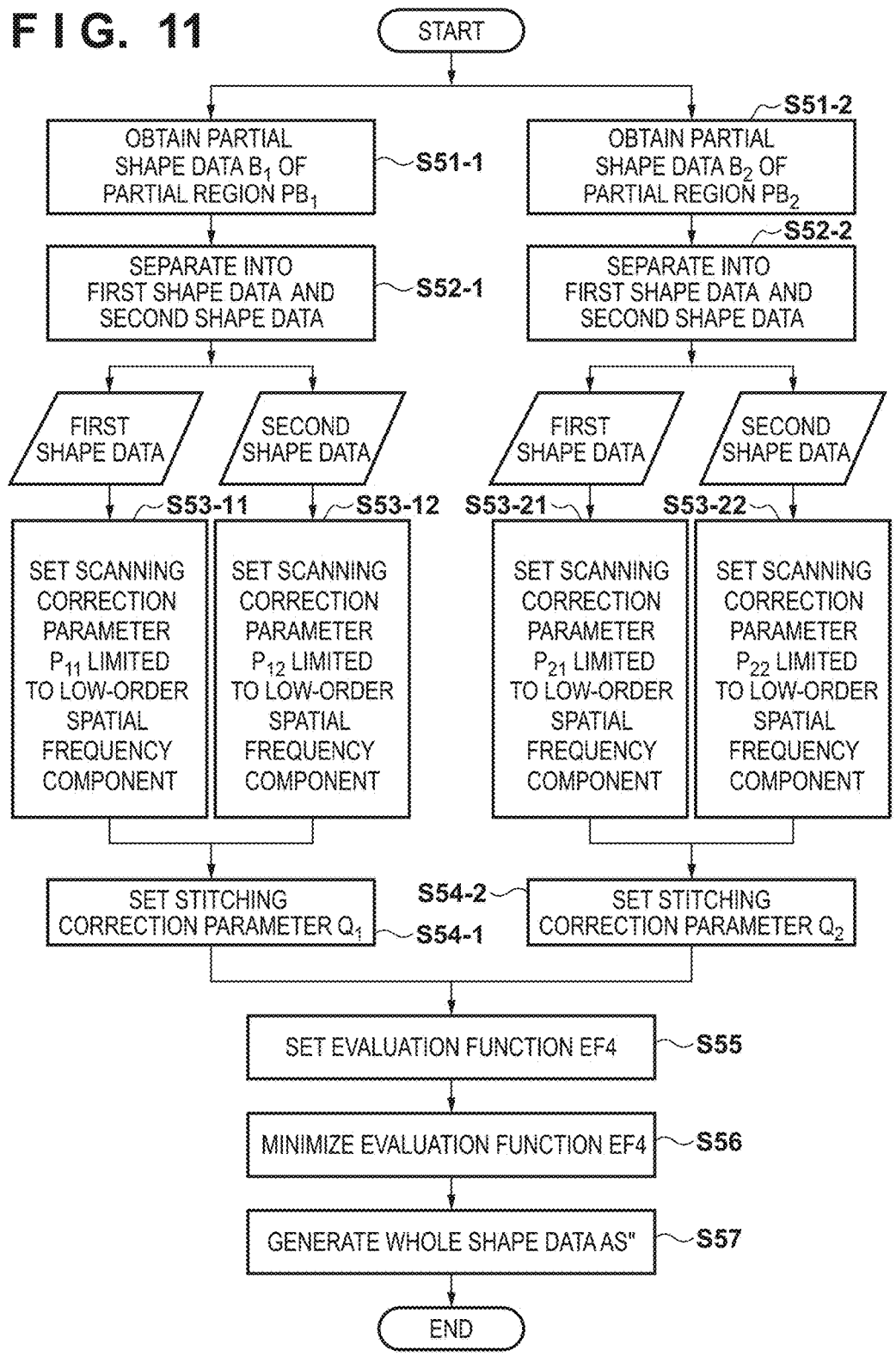
FIG. 11 is a flowchart for explaining a measurement method according to the fifth embodiment.

FIG. 11 is a flowchart for explaining a measurement method according to this embodiment. Note that steps S51-1 to S52-2 and S54-1 to S57 shown in FIG. 11 are the same as steps S41-1 to S42-2 and S44-1 to S47 shown in FIG. 10, so a detailed explanation thereof will be omitted.

Assume that when the measurement target surface W has divergence from a designed shape, scanning correction parameters are unlimitedly set as in the fourth embodiment. In this case, a high-order shape error contained in the real shape of the measurement target surface may also be corrected in addition to measurement errors caused by the scanning directions of a measurement probe between shape data and stitching errors. This makes it impossible to accurately measure a shape error contained in the real shape of the measurement target surface W.

As explained in the second embodiment, a measurement error caused by the scanning direction of a measurement probe is represented by equations (4) and (5). Accordingly, it is assumed that this measurement error is mainly a relatively low-order spatial frequency component shape error caused by an inclination angle θ of the measurement target surface.

In this embodiment, therefore, in step S53-11, a scanning correction parameter $P_{11}$ limited to a relatively low-order spatial frequency component is set as a parameter to be given to first shape data $A_{11}$. Similarly, in step S53-12, a scanning correction parameter $P_{12}$ limited to a relatively low-order spatial frequency component is set as a parameter to be given to second shape data $A_{12}$. In step S53-21, a scanning correction parameter $P_{21}$ limited to a relatively low-order spatial frequency component is set as a parameter to be given to first shape data $A_{21}$. In step S53-22, a scanning correction parameter $P_{22}$ limited to a relatively low-order spatial frequency component is set as a parameter to be given to second shape data $A_{22}$.

By thus limiting the scanning correction parameters $P_{11}$, $P_{12}$, $P_{21}$, and $P_{22}$ to only low-order spatial frequency components, it is possible to correct only measurement errors caused by the scanning directions of the measurement probe 101 while accurately measuring the shapes of high-order spatial frequency components.

The scanning correction parameters $P_{11}$, $P_{12}$, $P_{21}$, and $P_{22}$ should contain a spatial frequency component having an order lower than the interval of adjacent shape data. Also, the scanning correction parameters $P_{11}$, $P_{12}$, $P_{21}$, and $P_{22}$ can freely be set as low-order spatial frequency components based on a spatial frequency required to measure the measurement target surface W. When the shape of the measurement target surface W is relatively simple, shapes (low-order shapes) corresponding to the fourth to ninth terms of the Zernike polynomials are often dominant in measurement errors caused by the scanning directions of the measurement probe 101 when the measurement errors are expressed by the Zernike polynomials. In this case, the scanning correction parameters $P_{11}$, $P_{12}$, $P_{21}$, and $P_{22}$ need only be so set as to contain the spatial frequency components corresponding to the fourth to ninth terms of the Zernike polynomials.

<Sixth Embodiment>

In this embodiment, a case in which the measurement target surface W has a low-order spatial frequency error shape will be explained in addition to the fifth embodiment. When a scanning correction parameter limited to a low-order spatial frequency component acts on shape data containing the real shape of the measurement target surface W, not only a measurement error but also the low-order shape itself of the measurement target surface W may be corrected. Also, matching with adjacent shape data need only be obtained regardless of how the low-order shape of the measurement target surface W changes. Depending on the type of evaluation function, however, the shape of the measurement target surface W and the scanning correction parameter are not uniquely determined and do not converge in some cases.

Setting a scanning correction parameter and stitching correction parameter by using several patterns will be explained below. In this case, if, for example, the spatial frequency band of the scanning correction parameter is changed, the measurement reliability of each spatial frequency band changes in accordance with a shape error of the measurement target surface W. As explained in the third embodiment, when using a scanning correction parameter and when using no scanning correction parameter, the reliability of a high-order spatial frequency component tends to increase in the former case, and the reliability of a low-order spatial frequency component tends to increase in the latter case.

Also, when a posture error of shape data is contained as a stitching correction parameter, problems as shown in FIGS. 12A to 12F sometimes arise. Assume that partial shape data $B_1$ and $B_2$ as shown in FIG. 12B are obtained by dividing the measurement target surface W shown in FIG. 12A into two partial regions and measuring them. Assume also that the partial shape data $B_1$ and $B_2$ contain a shape error caused by the scanning direction of the measurement probe 101, and a posture error having occurred during the measurement.

The partial shape data $B_1$ contains first and second shape data $A_{11}$ and $A_{12}$, and each shape data is corrected by a scanning correction parameter for correcting the error as shown in FIG. 12C. Consequently, whole shape data $AS_1''$ shown in FIG. 12D is obtained. The comparison of the whole shape data $AS_1''$ shown in FIG. 12D with the real shape of the measurement target surface W shows that high-order shape components are well synthesized, but there is a large divergence in low-order shape components.

On the other hand, when the partial shape data $B_1$ and $B_2$ are synthesized by using only the stitching correction parameter as shown in FIG. 12E, whole shape data $AS_2''$ shown in FIG. 12F is obtained. The comparison of the whole shape data $AS_2''$ shown in FIG. 12F with the real shape of the measurement target surface W reveals that low-order shape components are well synthesized, but high-order shape components contain a stepped error.

This means that the shape of the measurement target surface W synthesized by the correction parameters changes, and the reliably changes for each spatial frequency component of the shape.

Figure 13A:
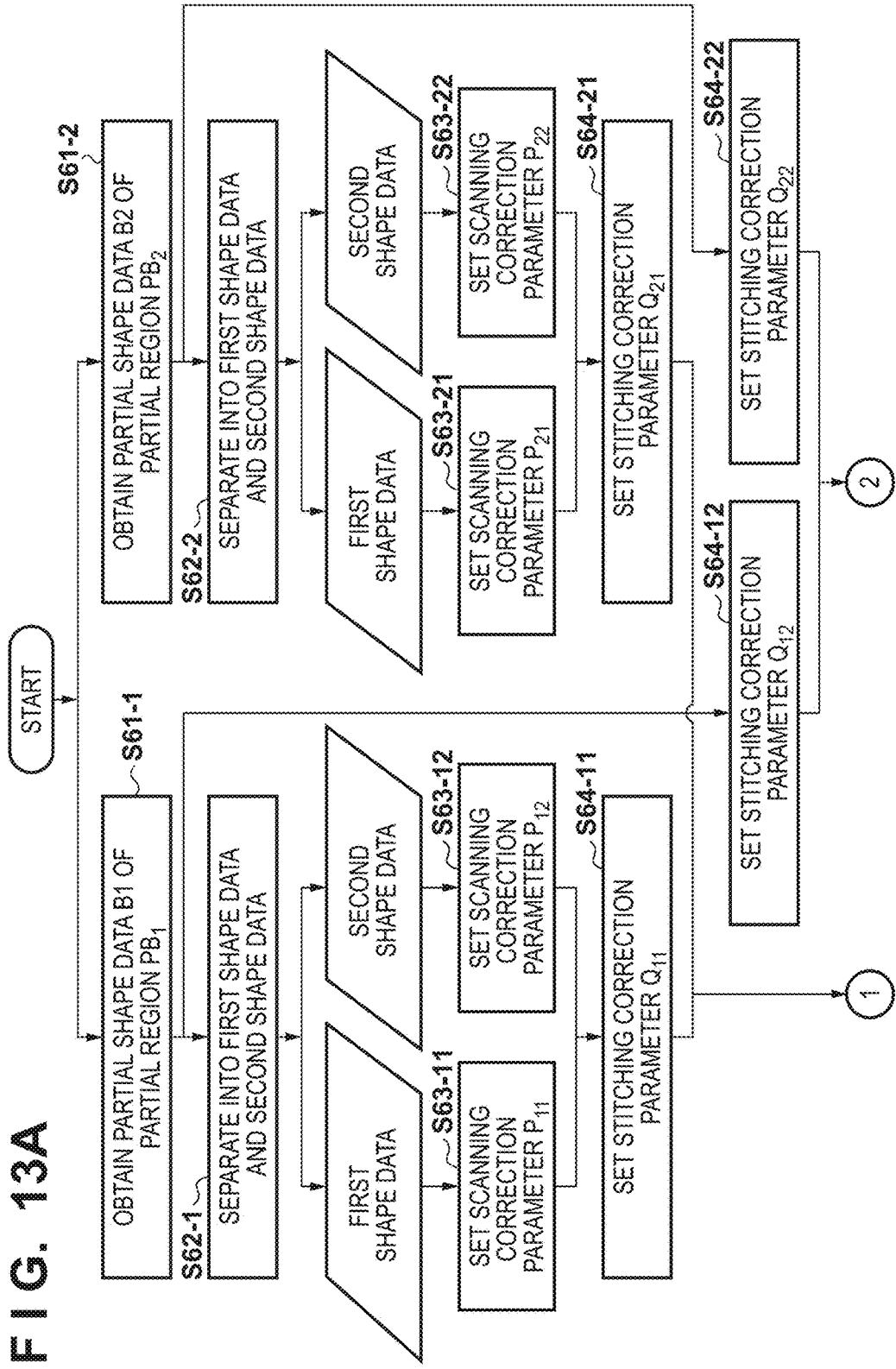
FIGS. 13A and 13B are flowcharts for explaining a measurement method according to the sixth embodiment.
Figure 13B:
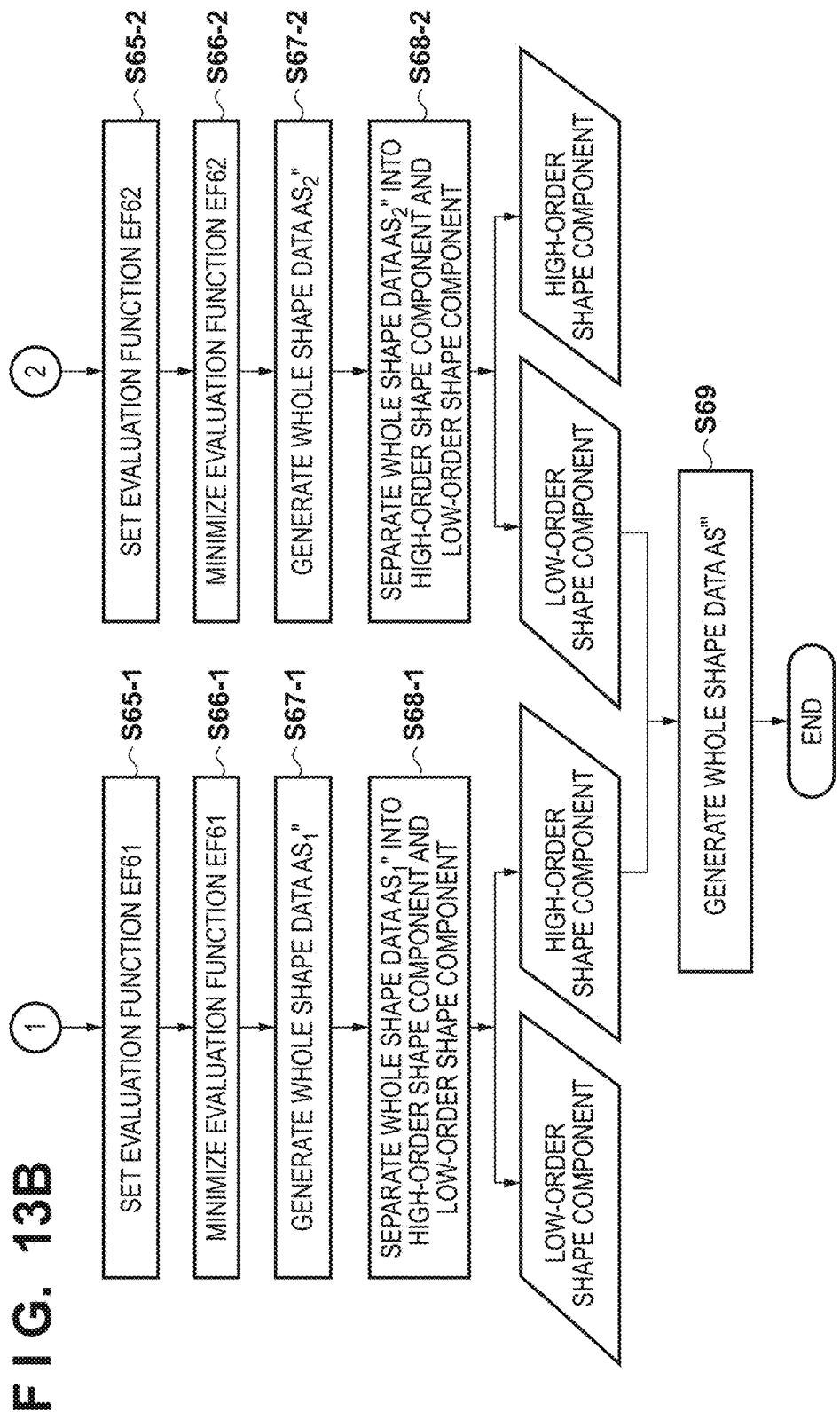

FIGS. 13A and 13B are flowcharts for explaining a measurement method according to this embodiment. Note that steps S61-1 to S63-22 shown in FIG. 13A are the same as steps S41-1 to S43-22 shown in FIG. 10, so a detailed explanation thereof will be omitted.

As parameters to be given to the partial shape data $B_1$, a stitching correction parameter $Q_{11}$ is set in step S64-11, and a stitching correction parameter $Q_{12}$ is set in step S64-12. Likewise, as parameters to be given to the partial shape data $B_2$, a stitching correction parameter $Q_{21}$ is set in step S64-21, and a stitching correction parameter $Q_{22}$ is set in step S64-22.

In step S65-1, an evaluation function EF61 is set based on scanning correction parameters $P_{11}$, $P_{12}$, $P_{21}$, and $P_{22}$ and the stitching correction parameters $Q_{11}$ and $Q_{21}$. In step S65-2, an evaluation function EF62 is set based on only the stitching correction parameters $Q_{12}$ and $Q_{22}$.

In step S66-1, (the value of) the evaluation function EF61 is minimized by making the scanning correction parameters $P_{11}$, $P_{12}$, $P_{21}$, and $P_{22}$ and stitching correction parameters $Q_{11}$ and $Q_{21}$ variable. In other words, the scanning correction parameters $P_{11}$, $P_{12}$, $P_{21}$, and $P_{22}$ and stitching correction parameters $Q_{11}$ and $Q_{21}$ are so determined as to minimize the evaluation function EF61.

In step S66-2, (the value of) the evaluation function EF62 is minimized by making the stitching correction parameters $Q_{12}$ and $Q_{22}$ variable. In other words, the stitching correction parameters $Q_{12}$ and $Q_{22}$ are so determined as to minimize the evaluation function EF62.

In step S67-1, the whole shape data $AS_1''$ representing the shape of the whole measurement target surface W is generated by using the scanning correction parameters $P_{11}$, $P_{12}$, $P_{21}$, and $P_{22}$ and stitching correction parameters $Q_{11}$ and $Q_{21}$ determined by minimizing the evaluation function EF61.

In step S67-2 (a seventh step), the whole shape data (fourth whole shape data) $AS_2''$ representing the shape of the whole measurement target surface W is generated. The whole shape data $AS_2''$ is generated by using the stitching correction parameter (a fifth correction parameter) $Q_{12}$ and the stitching correction parameter (a sixth correction parameter) $Q_{22}$ determined by minimizing the evaluation function EF62.

In step S68-1 (an eighth step), the whole shape data $AS_1''$ generated in step S67-1 is separated into high-order spatial frequency component shape data (a high-order shape component), and low-order spatial frequency component shape data (a low-order shape component) having an order equal to or lower than a predetermined order. In other words, shape data of a spatial frequency component having an order higher than the predetermined order is extracted from the whole shape data $AS_1''$.

In step S68-2 (a ninth step), the whole shape data $AS_2''$ generated in step S67-2 is separated into high-order spatial frequency component shape data (a high-order shape component), and low-order spatial frequency component shape data (a low-order shape component) having an order equal to or lower than a predetermined order. In other words, shape data of a spatial frequency component having an order equal to or lower than the predetermined order is extracted from the whole shape data $AS_2''$.

In step S69 (a 10th step), whole shape data (fifth whole shape data) $AS'''$ representing the shape of the whole measurement target surface W is generated by synthesizing the high-order shape component separated (extracted) in step S68-1 and the low-order shape component separated (extracted) in step S68-2.

In this embodiment, the low- and high-order shape components are preferably independent, and preferably contain the whole spatial frequency region. This makes it possible to synthesize the shapes of the individual spatial frequency regions by simple addition of the independent components, and obviates the need for any special shape synthesizing method.

Also, in this embodiment, only two types of correction parameters are set for two partial shape data. In practice, however, arbitrary correction parameters can be set for an arbitrary number of partial shape data.

The measurement method of this embodiment can avoid the possibility that the shape of a low-order spatial frequency component contains an error depending on the evaluation function, while reducing the high-order spatial frequency component shape error caused by the scanning direction of the measurement probe 101.

<Seventh Embodiment>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-191876 filed on Sep. 19, 2014, which is hereby incorporated by reference herein in its entirety.

What is claimed is:

1. A calculation method of calculating a shape of a measurement target surface, the method comprising:
    a first step of obtaining, while scanning a probe contacting the measurement target surface in a first direction, first shape measurement data of a line region of the measurement target surface, which represents a shape of the line region by detecting a position of the probe during scanning, and obtaining, while scanning the probe contacting the measurement target surface in a second direction different from the first direction, second shape measurement data of a line region of the measurement target surface, which represents a shape of the line region by detecting a position of the probe during scanning;
    a second step of obtaining first corrected shape data by correcting the first shape measurement data using a first correction parameter for correcting a first measurement error caused by scanning the probe in the first direction, and obtaining second corrected shape data by correcting the second shape measurement data using a second correction parameter for correcting a second measurement error caused by scanning the probe in the second direction;
    a third step of generating first whole shape data representing a shape of the whole measurement target surface by synthesizing the first corrected shape data and the second corrected shape data; and
    a fourth step of correcting the first shape measurement data obtained in the first step while changing the first correction parameter, correcting the second shape measurement data obtained in the first step while changing the second correction parameter, obtaining a value of an evaluation function for evaluating the first corrected shape data and the second corrected shape data obtained in the second step, whenever the first correction parameter and the second correction parameter are changed, and determining the first correction parameter and the second correction parameter so that the value of the evaluation function falls within an allowable range.

2. The method according to claim 1, wherein the first correction parameter and the second correction parameter contain a spatial frequency component having an order lower than an interval between the first shape measurement data and the second shape measurement data.

3. The method according to claim 1, wherein:
    each of the first and second measurement errors is represented by Zernike polynomials, and
    the first correction parameter and the second correction parameter contain spatial frequency components corresponding to fourth to ninth terms of the Zernike polynomials.

4. The method according to claim 1, further comprising:
    a fifth step of extracting shape data of a high-order spatial frequency component having an order higher than a predetermined order from the first whole shape data generated in the third step;
    a sixth step of extracting shape data of a low-order spatial frequency component having an order not more than the predetermined order from the first shape measurement data and the second shape measurement data obtained in the first step; and
    a seventh step of generating second whole shape data representing the shape of the whole measurement target surface by synthesizing the shape data of the high-order frequency component extracted in the fifth step and the low-order spatial frequency component extracted in the sixth step.

5. The method according to claim 1, wherein:
    the first step obtains partial shape data containing the first shape measurement data and the second shape measurement data for each of a plurality of partial regions of the measurement target surface, and
    the second step obtains third corrected shape data by correcting first partial shape data of the partial shape data using the first correction parameter and the second correction parameter corresponding to the first partial shape data and a third correction parameter for correcting a third measurement error contained in the first partial shape data, obtains fourth corrected shape data by correcting a second partial shape data of the partial shape data using the first correction parameter and the second correction parameter corresponding to the second partial shape data and a fourth correction parameter for correcting a fourth measurement error contained in the second partial shape data, and the third step generates second whole shape data representing the shape of the whole measurement target surface by synthesizing the third corrected shape data and the fourth corrected shape data.

6. The method according to claim 5, further comprising:
a fifth step of obtaining fifth corrected shape data by correcting the first partial shape data using a fifth correction parameter for correcting the third measurement error contained in the first partial shape data, obtaining sixth corrected shape data by correcting the second partial shape data using a sixth correction parameter for correcting the fourth measurement error contained in the second partial shape data;
a sixth step of generating third whole shape data representing the shape of the whole measurement target surface by synthesizing the fifth corrected shape data and the sixth corrected shape data;
a seventh step of extracting shape data of a high-order spatial frequency component having an order higher than a predetermined order from the second whole shape data generated in the third step;
an eighth step of extracting shape data of a low-order spatial frequency component having an order not more than the predetermined order from the third whole shape data generated in the sixth step; and
a ninth step of generating fourth whole shape data representing the shape of the whole measurement target surface by synthesizing the shape data of the high-order frequency component extracted in the seventh step and the shape data of the low-order spatial frequency component extracted in the eighth step.

7. The method according to claim 1, wherein the first direction and the second direction are opposite directions.

8. The method according to claim 1, wherein the measurement target surface includes a portion having an inclination angle with respect to a scanning direction of the probe.

9. A non-transitory computer-readable storage medium storing a program executable by a computer to execute a method of obtaining a shape of a measurement target surface, the method comprising:
a first step of obtaining, while scanning a probe contacting the measurement target surface in a first direction, first shape measurement data of a line region of the measurement target surface, which represents a shape of the line region by detecting a position of the probe during scanning, and obtaining, while scanning the probe contacting the measurement target surface in a second direction different from the first direction, second shape measurement data of a line region of the measurement target surface, which represents a shape of the line region by detecting a position of the probe during scanning;
a second step of obtaining first corrected shape data by correcting the first shape measurement data using a first correction parameter for correcting a first measurement error caused by scanning the probe in the first direction, and obtaining second corrected shape data by correcting the second shape measurement data using a second correction parameter for correcting a second measurement error caused by scanning the probe in the second direction;
a third step of generating whole shape data representing a shape of the whole measurement target surface by synthesizing the first corrected shape data and the second corrected shape data; and
a fourth step of correcting the first shape measurement data obtained in the first step while changing the first correction parameter, correcting the second shape measurement data obtained in the first step while changing the second correction parameter, obtaining a value of an evaluation function for evaluating the first corrected shape data and the second corrected shape data obtained in the second step, whenever the first correction parameter and the second correction parameter are changed, and determining the first correction parameter and the second correction parameter so that the value of the evaluation function falls within an allowable range.

10. An information processing apparatus, the apparatus comprising:
a processor configured to obtain a shape of a measurement target surface by executing:
a first task that obtains first shape measurement data, which is obtained while scanning a probe contacting the measurement target surface in a first direction, of a line region of the measurement target surface, which represents a shape of the line region by detecting a position of the probe during scanning, and obtains second shape measurement data, which is obtained while scanning the probe contacting the measurement target surface in a second direction different from the first direction, of a line region of the measurement target surface, which represents a shape of the line region by detecting a position of the probe during scanning;
a second task that obtains first corrected shape data by correcting the first shape measurement data using a first correction parameter for correcting a first measurement error caused by scanning the probe in the first direction, and obtains second corrected shape data by correcting the second shape measurement data using a second correction parameter for correcting a second measurement error caused by scanning the probe in the second direction;
a third task that generates whole shape data representing a shape of the whole measurement target surface by synthesizing the first corrected shape data and the second corrected shape data; and
a fourth task that corrects the first shape measurement data obtained in the first task while changing the first correction parameter, corrects the second shape measurement data obtained in the first task while changing the second correction parameter, obtains a value of an evaluation function for evaluating the first corrected shape data and the second corrected shape data obtained in the second task, whenever the first correction parameter and the second correction parameter are changed, and determines the first correction parameter and the second correction parameter so that the value of the evaluation function falls within an allowable range.

11. A measurement apparatus for measuring a shape of a measurement target surface, the measurement apparatus comprising:
a probe configured to measure the measurement target surface; and
a control unit configured to obtain the shape of the measurement target surface by:
obtaining first shape measurement data, which is obtained, while scanning the probe contacting the measurement target surface in a first direction, of a line region of the measurement target surface, which represents a shape of the line region by detecting a position of the probe during scanning, and obtaining second shape measurement data, which is obtained while scanning the probe contacting the measurement target surface in a second direction different from the first direction, of a line region of the measurement target surface, which represents a shape of the line region by detecting a position of the probe during scanning;

obtaining first corrected shape data by correcting the first shape measurement data using a first correction parameter for correcting a first measurement error caused by scanning the probe in the first direction, and obtaining second corrected shape data by correcting the second shape measurement data using a second correction parameter for correcting a second measurement error caused by scanning the probe in the second direction;

generating first whole shape data representing a shape of the whole measurement target surface by synthesizing the corrected shape data and the second corrected shape data; and correcting the obtained first shape measurement data while changing the first correction parameter, correcting the obtained second shape measurement data while changing the second correction parameter, obtaining a value of an evaluation function for evaluating the obtained first corrected shape data and the obtained second corrected shape data, whenever the first correction parameter and the second correction parameter are changed, and determining the first correction parameter and the second correction parameter so that the value of the evaluation function falls within an allowable range.

* * * * *